US012380556B2

(12) United States Patent
Xin et al.

(10) Patent No.: US 12,380,556 B2
(45) Date of Patent: Aug. 5, 2025

(54) SYSTEMS AND METHODS FOR IMAGE PROCESSING

(71) Applicant: SHANGHAI UNITED IMAGING HEALTHCARE CO., LTD., Shanghai (CN)

(72) Inventors: Yang Xin, Shanghai (CN); Yuhang Shi, Shanghai (CN); Guobin Li, Shanghai (CN); Lixiang Hu, Shanghai (CN); Yanxia Chen, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 512 days.

(21) Appl. No.: 17/661,268

(22) Filed: Apr. 28, 2022

(65) Prior Publication Data

US 2022/0351372 A1 Nov. 3, 2022

(30) Foreign Application Priority Data

Apr. 28, 2021 (CN) ........................ 202110469953.2
Jul. 22, 2021 (CN) ........................ 202110833211.3

(51) Int. Cl.
*G06T 7/12* (2017.01)
*G06T 7/00* (2017.01)

(52) U.S. Cl.
CPC .. *G06T 7/0012* (2013.01); *G06T 2207/20081* (2013.01); *G06T 2207/30168* (2013.01)

(58) Field of Classification Search
CPC ......... G06T 7/0012; G06T 2207/20081; G06T 2207/30168

(Continued)

(56) References Cited

U.S. PATENT DOCUMENTS

2005/0113960 A1* 5/2005 Karau .................. A61B 6/4085
                                                    700/182
2013/0136322 A1* 5/2013 Zhan ........................ G06T 7/73
                                                    382/128

(Continued)

FOREIGN PATENT DOCUMENTS

CN     109512448 A    3/2019
CN     112149756 A    12/2020

(Continued)

OTHER PUBLICATIONS

First Office Action in Chinese Application No. 202110833211.3 mailed on May 30, 2025, 13 pages.

*Primary Examiner* — Michael R Neff
(74) *Attorney, Agent, or Firm* — METIS IP LLC

(57) ABSTRACT

A method may include obtaining an image of an object; obtaining a target artifact identification model; determining target artifact feature information by inputting the image into the target artifact identification model, the target artifact feature information indicating a feature of one or more artifacts in the image; obtaining a target artifact extent determination model; determining target artifact extent indication information by inputting the image and the target artifact feature information into the target artifact extent determination model, the target artifact extent indication information indicating an influence extent of the one or more artifacts on an image quality of the image; in response to determining that the influence extent is greater than or equal to the extent threshold, outputting a notice of the one or more artifacts of the image.

19 Claims, 17 Drawing Sheets

(58) Field of Classification Search
USPC .......................................................... 382/128
See application file for complete search history.

(56) References Cited

U.S. PATENT DOCUMENTS

| | | |
|---|---|---|
| 2017/0372155 A1 | 12/2017 | Odry et al. |
| 2019/0147588 A1 | 5/2019 | Rowley Grant et al. |
| 2020/0051239 A1 | 2/2020 | Braun et al. |
| 2024/0315552 A1* | 9/2024 | Sarver .................. G06T 7/0012 |

FOREIGN PATENT DOCUMENTS

| | | |
|---|---|---|
| CN | 112766323 A | 5/2021 |
| WO | 2020232998 A1 | 11/2020 |

* cited by examiner

500

501 — Determining target artifact feature information by inputting an image into a target artifact identification model, the target artifact feature information indicating a feature of one or more artifacts in the image

502 — Determining target artifact extent indication information by inputting the image and the target artifact feature information into a target artifact extent determination model, the target artifact extent indication information indicating an influence extent of the one or more artifacts on an image quality of the image

503 — In response to a determination that the influence extent is greater than or equal to an extent threshold, outputting a notice of the one or more artifacts of the image

801 Obtaining field intensity information of an imaging device corresponding to the image 802 Obtaining an imaging information identification model corresponding to the field intensity information 803 Identifying an imaging region and an imaging plane of the object by inputting the image into the imaging information identification model

1301 Obtaining a candidate artifact identification model by training, based on fourth training sample images, a fourth preliminary model

1302 Obtaining an intermediate artifact feature information by inputting fifth training sample images into the candidate artifact identification model, and designating the intermediate artifact feature information as a first pseudo label of the fifth training sample images

1303 Obtaining the target artifact identification model by training, based on the fourth training sample images with a first label and the fifth training sample images with the first pseudo label, the candidate artifact identification model

1501 — Obtaining a first output artifact feature information by inputting the fourth training sample images into the candidate artifact identification model, and determining a first loss value based on the first output artifact feature information and the first label

1502 — Obtaining a second output artifact feature information by inputting the fifth training sample images into the candidate artifact identification model, and determining a second loss value based on the second output artifact feature information and the first pseudo label

1503 — Obtaining a first weight corresponding to the first loss value and a second weight corresponding to the second loss value, and determining a first target loss value by determining, based on the first weight and the second weight, a weighted sum of the first loss value and the second loss value

1601 — Obtaining a candidate artifact extent determination model by training, based on sixth training sample images, a fifth preliminary model 1602 — Obtaining an intermediate artifact extent indication information by inputting seventh training sample images into the candidate artifact extent determination model, and designating the intermediate artifact extent indication information as a second pseudo label of the seventh training sample images 1603 — Obtaining the target artifact extent determination model by training, based on the sixth training sample images with a second label and the seventh training sample images with the second pseudo label, the candidate artifact extent determination model

Obtaining a first output artifact extent indication information by inputting the sixth training sample images into the candidate artifact extent determination model, and determining a third loss value based on the first output artifact extent indication information and the second label — 1601

Obtaining a second output artifact extent indication information by inputting the seventh training sample images into the candidate artifact extent indication model, and determining a fourth loss value based on the second output artifact extent indication information and the second pseudo label — 1602

Determining a second target loss value based on the third loss value and the fourth loss value, and obtaining the target artifact extent determination model by updating, based on the second target loss value, the candidate artifact extent determination model — 1603

FIG. 17

SYSTEMS AND METHODS FOR IMAGE PROCESSING

CROSS-REFERENCE TO RELATED APPLICATIONS

This application claims priority of Chinese Patent Application No. 202110469953.2 filed on Apr. 28, 2021, and Chinese Patent Application No. 202110833211.3 filed on Jul. 22, 2021, the contents of which are incorporated herein by reference.

TECHNICAL FIELD

The present disclosure generally relates to image processing, and more particularly, systems and methods for artifact identification in a medical image.

BACKGROUND

In a process of medical imaging, a motion artifact may appear in an image due to the influence of the state of the scanned subject (e.g., a patient), the state of the imaging device, or the external environment. The motion artifact may have a negative influence on the image quality of the resultant image. In a workflow, after an image of a region of interest (ROI) of a subject is generated, a user (e.g., a doctor, an operator, a technician, an engineer, etc.) may check the generated image to determine an influence of the motion artifact in the image on the image quality, and determine, based on the influence of the artifact on the image quality, whether it is necessary to perform additional scanning operation on the ROI or re-scan the ROI. It is desirable to methods and systems to improve the efficiency and accuracy of the above workflow.

SUMMARY

According to a first aspect of the present disclosure, a system may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may obtain an image of an object. The one or more processors may obtain a target artifact identification model. The one or more processors may determine target artifact feature information by inputting the image into the target artifact identification model. The target artifact feature information may indicate a feature of one or more artifacts in the image. The one or more processors may obtain a target artifact extent determination model. The one or more processors may determine target artifact extent indication information by inputting the image and the target artifact feature information into the target artifact extent determination model. The target artifact extent indication information may indicate an influence extent of the one or more artifacts on an image quality of the image. The one or more processors may determine, based on the target artifact extent indication information, whether the influence extent is greater than or equal to an extent threshold. In response to determining that the influence extent is greater than or equal to the extent threshold, the one or more processors may output a notice of the one or more artifacts of the image.

In some embodiments, the one or more processors may identify, in the image, an anatomical portion of the object and an imaging plane of the object.

In some embodiments, to identify the anatomical portion of the object and the imaging plane of the object before determining the target artifact feature information, the one or more processors may obtain magnetic field intensity information of an imaging device. The imaging device may be configured to scan the object to generate the image. The one or more processors may obtain an imaging information identification model corresponding to the magnetic field intensity information. The one or more processors may identify the anatomical portion and the imaging plane of the object by inputting the image into the imaging information identification model.

In some embodiments, the target artifact identification model may be obtained based on the magnetic field intensity information of the imaging device corresponding to the image, the anatomical portion, and the imaging plane.

In some embodiments, to identify the anatomical portion of the object and the imaging plane of the object after determining the target artifact feature information, the one or more processors may obtain magnetic field intensity information of an imaging device, the imaging device being configured to scan the object to generate the image. The one or more processors may obtain an imaging information identification model corresponding to the magnetic field intensity information and the target artifact feature information. The one or more processors may identify the anatomical portion and the imaging plane of the object by inputting the image into the imaging information identification model.

In some embodiments, the target artifact identification model may be obtained based on the magnetic field intensity information of the imaging device corresponding to the image.

In some embodiments, the target artifact extent determination model may be obtained based on at least one of magnetic field intensity information of an imaging device corresponding to the image, the target artifact feature information, the anatomical portion, or the imaging plane.

In some embodiments, the target artifact identification model may be obtained by: obtaining a first training sample set including a plurality of first training samples, and obtaining the target artifact identification model by training, based on the first training sample set, a first preliminary model. Each of the plurality of first training samples may include a first training sample image and training artifact feature information corresponding to the first training sample image.

In some embodiments, obtaining the target artifact identification model by training, based on the first training sample set, the first preliminary model includes: performing, based on a standard score, normalization on a brightness of each first training sample image in the first training sample set; and obtaining the target artifact identification model by training, based on the normalized first training sample set, the first preliminary model.

In some embodiments, the target artifact extent determination model may be obtained by: obtaining a second training sample set including a plurality of second training samples, each of the plurality of second training samples including a second training sample image and training artifact extent indication information corresponding to the second training sample image; and obtaining the target artifact extent determination model by training, based on the second training sample set, a second preliminary model.

In some embodiments, obtaining the target artifact extent determination model by training, based on the second training sample set, the second preliminary model includes: performing, based on a standard score, normalization on a brightness of each second training sample image in the second training sample set; and obtaining the target artifact extent determination model by training, based on the normalized second training sample set, the second preliminary model.

In some embodiments, the target artifact identification model may be obtained based on a third training sample set. The third training sample set may include third training sample images each of which is with a first label and fourth training sample images without the first label, the first label including training artifact feature information.

In some embodiments, the target artifact identification model may be obtained by: obtaining a candidate artifact identification model by training, based on the third training sample images, a first preliminary model; obtaining an intermediate artifact feature information by inputting the fourth training sample images into the candidate artifact identification model; designating the intermediate artifact feature information as a first pseudo label of the fourth training sample images; obtaining the target artifact identification model by training, based on the third training sample images with the first label and the fourth training sample images with the first pseudo label, the candidate artifact identification model.

In some embodiments, obtaining the target artifact identification model by training, based on the third training sample images with the first label and the fourth training sample images with the first pseudo label, the candidate artifact identification model includes: obtaining a first output artifact feature information by inputting the third training sample images into the candidate artifact identification model; determining a first loss value based on the first output artifact feature information and the first label; obtaining a second output artifact feature information by inputting the fourth training sample images into the candidate artifact identification model; determining a second loss value based on the second output artifact feature information and the first pseudo label; determining a first target loss value based on the first loss value and the second loss value; and obtaining the target artifact identification model by updating, based on the first target loss value, the candidate artifact identification model.

In some embodiments, determining the first target loss value based on the first loss value and the second loss value includes: obtaining a first weight corresponding to the first loss value and a second weight corresponding to the second loss value; and determining the first target loss value by determining, based on the first weight and the second weight, a weighted sum of the first loss value and the second loss value.

In some embodiments, the target artifact extent determination model may be obtained based on a fourth training sample set. The fourth training sample set may include a plurality of fifth training sample images each of which is with a second label, and a plurality of sixth training sample images without the second label. The second label may include training artifact extent indication information.

In some embodiments, the target artifact extent determination model may be obtained by: obtaining a candidate artifact extent determination model by training, based on the fifth training sample images, a second preliminary model; obtaining an intermediate artifact extent indication information by inputting the sixth training sample images into the candidate artifact extent determination model; designating the intermediate artifact extent indication information as a second pseudo label of the sixth training sample images; obtaining the target artifact extent determination model by training, based on the fifth training sample images with the second label and the sixth training sample images with the second pseudo label, the candidate artifact extent determination model.

In some embodiments, obtaining the target artifact extent determination model by training, based on the fifth training sample images with the second label and the sixth training sample images with the second pseudo label, the candidate artifact extent determination model includes: obtaining a first output artifact extent indication information by inputting the fifth training sample images into the candidate artifact extent determination model; determining a third loss value based on the first output artifact extent indication information and the second label; obtaining a second output artifact extent indication information by inputting the sixth training sample images into the candidate artifact extent indication model; determining a fourth loss value based on the second output artifact extent indication information and the second pseudo label; determining a second target loss value based on the third loss value and the fourth loss value; and obtaining the target artifact extent determination model by updating, based on the second target loss value, the candidate artifact extent determination model.

In some embodiments, determining the second target loss value based on the third loss value and the fourth loss value includes: obtaining a third weight corresponding to the third loss value and a fourth weight corresponding to the fourth loss value; and determining the second target loss value by determining, based on the third weight and the fourth weight, a weighted sum of the third loss value and the fourth loss value.

According to another aspect of the present disclosure, a method may include one or more of the following operations. One or more processors may obtain an image of an object. The one or more processors may obtain a target artifact identification model. The one or more processors may determine target artifact feature information by inputting the image into the target artifact identification model. The target artifact feature information may indicate a feature of one or more artifacts in the image. The one or more processors may obtain a target artifact extent determination model. The one or more processors may determine target artifact extent indication information by inputting the image and the target artifact feature information into the target artifact extent determination model. The target artifact extent indication information may indicate an influence extent of the one or more artifacts on an image quality of the image. The one or more processors may determine, based on the target artifact extent indication information, whether the influence extent is greater than or equal to an extent threshold. In response to determining that the influence extent is greater than or equal to the extent threshold, the one or more processors may output a notice of the one or more artifacts of the image.

According to yet another aspect of the present disclosure, a system may include a feature determination module configured to obtain an image of an object. The feature determination module may be further configured to obtain a target artifact identification model. The feature determination module may be further configured to determine target artifact feature information by inputting the image into the target artifact identification model. The target artifact feature information may indicate a feature of one or more artifacts in the image. The system may also include an extent determination module configured to obtain a target artifact extent determination model, and determine target artifact extent indication information by inputting the image and the target artifact feature information into the target artifact extent determination model. The target artifact extent indication information may indicate an influence extent of the one or more artifacts on an image quality of the image. The system may also include an output module configured to determine, based on the target artifact extent indication information, whether the influence extent is greater than or equal to an extent threshold. In response to determining that the influence extent is greater than or equal to the extent threshold, the output module may be further configured to output a notice of the one or more artifacts of the image.

According to yet another aspect of the present disclosure, a non-transitory computer readable medium may comprise at least one set of instructions. The at least one set of instructions may be executed by one or more processors of a computing device. The one or more processors may obtain an image of an object. The one or more processors may obtain a target artifact identification model. The one or more processors may determine target artifact feature information by inputting the image into the target artifact identification model. The target artifact feature information may indicate a feature of one or more artifacts in the image. The one or more processors may obtain a target artifact extent determination model. The one or more processors may determine target artifact extent indication information by inputting the image and the target artifact feature information into the target artifact extent determination model. The target artifact extent indication information may indicate an influence extent of the one or more artifacts on an image quality of the image. The one or more processors may determine, based on the target artifact extent indication information, whether the influence extent is greater than or equal to an extent threshold. In response to determining that the influence extent is greater than or equal to the extent threshold, the one or more processors may output a notice of the one or more artifacts of the image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 is a flowchart illustrating an exemplary process for image processing according to some embodiments of the present disclosure;

FIG. 8 is a flowchart illustrating an exemplary process for identifying an imaging region and an imaging plane in an image according to some embodiments of the present disclosure;

FIG. 13 is a flowchart illustrating an exemplary training process for obtaining a target artifact identification model according to some embodiments of the present disclosure;

FIG. 15 is a flowchart illustrating an exemplary training process for obtaining a target artifact identification model according to some embodiments of the present disclosure;

FIG. 16 is a flowchart illustrating an exemplary training process for obtaining a target artifact indication determination model according to some embodiments of the present disclosure; and FIG. 17 is a flowchart illustrating an exemplary training process for obtaining a target artifact indication determination model according to some embodiments of the present disclosure.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by other expression if they achieve the same purpose.

Figure 2:
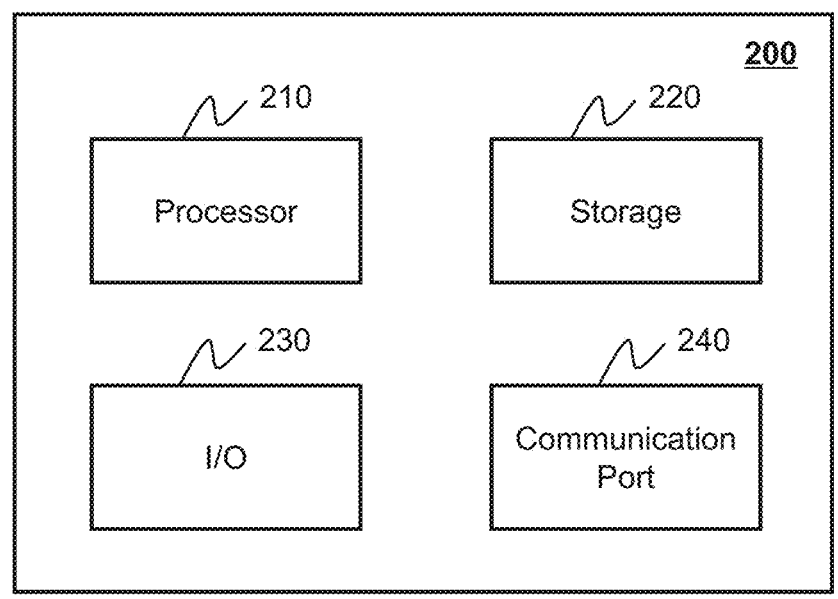
FIG. 2 is a schematic diagram illustrating hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

For illustration purposes, the following description is provided to help better understanding a process for exposure controlling. It is understood that this is not intended to limit the scope of the present disclosure. For persons having ordinary skills in the art, a certain amount of variations, changes and/or modifications may be deducted under the guidance of the present disclosure. Those variations, changes and/or modifications do not depart from the scope of the present disclosure.

Provided herein are systems and components for medical imaging and/or medical treatment. In some embodiments, the medical system may include an imaging system. The imaging system may include a single modality imaging system and/or a multi-modality imaging system. The single modality imaging system may include, for example, a computed tomography (CT) system, a magnetic resonance imaging (MRI) system, a positron emission tomography (PET) system, an ultrasound system, or the like. Exemplary MRI systems may include a superconducting magnetic resonance imaging system, a non-superconducting magnetic resonance imaging system, etc. The multi-modality imaging system may include, for example, a computed tomography-magnetic resonance imaging (MRI-CT) system, a positron emission tomography-magnetic resonance imaging (PET-MRI) system, a single photon emission computed tomography-magnetic resonance imaging (SPECT-MRI) system, a digital subtraction angiography-magnetic resonance imaging (DSA-MRI) system, a computed tomography-positron emission tomography (CT-PET) system, etc. In some embodiments, the medical system may include a treatment system. The treatment system may include a treatment plan system (TPS), image-guide radiotherapy (IGRT), etc. The image-guide radiotherapy (IGRT) may include a treatment device and an imaging device. The treatment device may include a linear accelerator, a cyclotron, a synchrotron, etc., configured to perform a radio therapy on a subject. The treatment device may include an accelerator of species of particles including, for example, photons, electrons, protons, or heavy ions. The imaging device may include an MRI scanner, a CT scanner (e.g., cone beam computed tomography (CBCT) scanner), a digital radiology (DR) scanner, an electronic portal imaging device (EPID), etc.

With the rapid development of science and technology, medical imaging technology is becoming more and more mature. In a process of medical imaging, artifact may appear in a target reconstructed medical image due to the influence of the state of the scanned subject, the state of the scanning device and the external environment. Some image information that does not exist in the human body in the reconstructed medical image corresponding to artifact may be often manifested as image deformation, overlap, missing or blur. The artifact may cause a decline of medical image quality, focus being masked or false focus, which may cause a misdiagnosis by a doctor. Therefore, it is necessary to minimize or even eliminate the artifact that may occur in the process of medical imaging, to make the medical imaging device run in a best state.

In the traditional technology, after generating the medical image generated, the scanning operator may check the generated medical image to determine the influence of artifact in the medical image on the image quality, and determine, based on the influence of artifact on the image quality, whether the scanned subject needs to be subjected to additional scanning operation or re-scanned.

However, because the scanning operator needs to check and judge the medical image, a judgment for the medical image may be highly subjective and inaccurate, so it is difficult to ensure the image quality.

The present disclosure provides a method for processing medical image for the above technical problems. The method may mainly include the following operations: inputting a medical image to a target artifact identification model to obtain target artifact feature information output by the target artifact identification model. The target artifact feature information may be used to indicate the attribute features of the artifact in the medical image. The target artifact identification model may be trained based on a fourth training sample set. The fourth training sample set may include fourth training medical images corresponding to a first label and the fifth training medical image not corresponding to the first label. The first label may include a priori artifact feature information, that is, the first label may be used to indicate the real artifact feature information. The medical image and the target artifact feature information may be input to a target artifact extent determination model to obtain target artifact extent indication information output by the target artifact extent determination model. The target artifact extent indication information may be used to indicate the influence degree of the artifact in the medical image on the image quality. The target artifact extent determination model may be trained based on a fifth training sample set, wherein the fifth training sample set may include sixth training medical images corresponding to a second label and seventh training medical images not corresponding to the second label. The second label may include a priori artifact extent indication information, that is, the second label may indicate a true artifact extent. If the influence degree of the artifact in the medical image on the image quality is greater than or equal to the predetermined artifact influence degree threshold, prompt information may be output to prompt a user to confirm whether to accept the artifact in the medical image and whether it is necessary to rescan the scanned part corresponding to the medical image. The embodiments of the present disclosure may provide a method for processing medical image processing in which the feature information of the target artifact may be accurately obtained after inputting the medical image into the target artifact identification model. Then, after inputting the feature information of the medical image and the target artifact into the target artifact extent determination model, the target artifact extent determination model may accurately and effectively determine the influence degree of the artifact in the medical image on the image quality based on the feature information of the target artifact. In addition, the processing device 140 may also compare the influence degree of the artifact in the medical image on the image quality with a predetermined artifact influence degree threshold, so that when the artifact has a great influence on the image quality of the medical image, it may prompt the information to the operation interface in time to further ensure the image quality. In addition, the target artifact identification model is trained based on the fourth training medical images corresponding to the first label and the fifth training medical images not corresponding to the first label, and the target artifact extent determination model is trained based on the sixth training medical images corresponding to the second label and the seventh training medical images not corresponding to the second label. Therefore, it may not only ensure the accuracy of the target artifact identification model and target artifact extent determination model, but also may reduce a count of label samples, reduce the dependence on label samples and improve the learning efficiency of the model. Inaccurate target artifact identification model caused by samples with different labeling rules may be avoid FIG. 1 is a schematic diagram illustrating an exemplary imaging system 100 according to some embodiments of the present disclosure.

Figure 1:
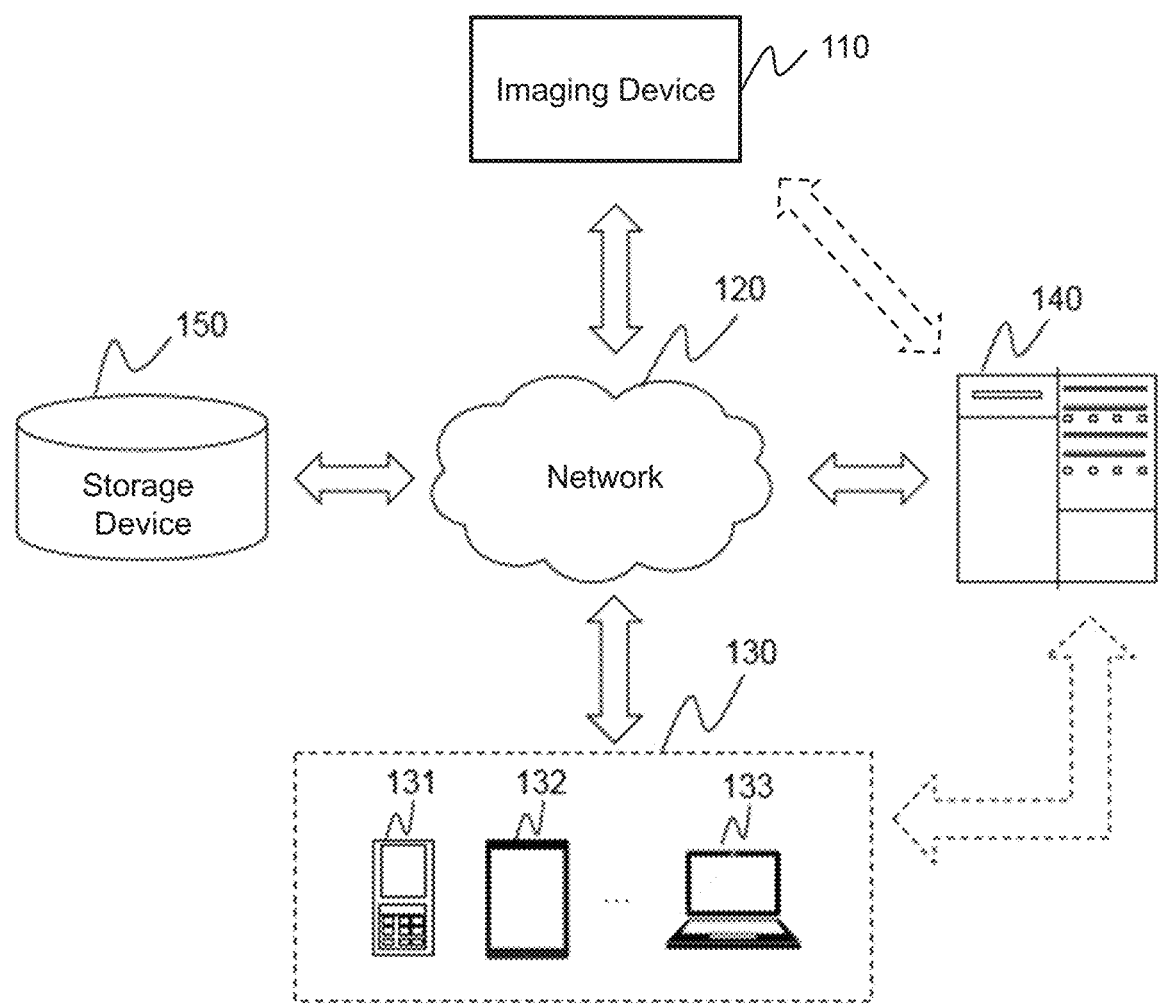
FIG. 1 is a schematic diagram illustrating an exemplary imaging system according to some embodiments of the present disclosure.

As illustrated in FIG. 1, the imaging system 100 may include an imaging device 110, a network 120, one or more terminals 130, a processing device 140, and a storage device 150.

In some embodiments, the components in the imaging system 100 may be connected in one or more of various ways. Merely by way of example, the imaging device 110 may be connected to the processing device 140 through the network 120. As another example, the imaging device 110 may be connected to the processing device 140 directly as indicated by the bi-directional arrow in dotted lines linking the imaging device 110 and the processing device 140. As a further example, the storage device 150 may be connected to the processing device 140 directly or through the network 120. As still a further example, the terminal 130 may be connected to the processing device 140 directly (as indicated by the bi-directional arrow in dotted lines linking the terminal 130 and the processing device 140) or through the network 120.

In some embodiments, the imaging device 110 may be configured to scan an object located within its detection region and acquire imaging data (e.g., magnetic resonance (MR) signals for MRI, projection data for CT or PET imaging, etc.) relating to the object. In the present disclosure, "subject" and "object" are used interchangeably. Mere by way of example, the object may include a patient, a man-made object, etc. As another example, the object may include a specific portion, organ, and/or tissue of a patient. For example, the object may include head, brain, neck, body, shoulder, arm, thorax, cardiac, stomach, blood vessel, soft tissue, knee, feet, or the like, or any combination thereof.

In some embodiments, the imaging device 110 may include a single modality imaging device and/or a multi-modality imaging device. The single modality imaging device may include, for example, a magnetic resonance imaging (MRI) device, a computed tomography (CT) device, a positron emission tomography (PET) device, a single photon emission computed tomography (SPECT) device, an ultrasound device, an X-ray device, or the like. The multi-modality imaging device may include, for example, a computed tomography-magnetic resonance imaging (MRI-CT) device, a positron emission tomography-magnetic resonance imaging (PET-MRI) device, a single photon emission computed tomography-magnetic resonance imaging (SPECT-MRI) device, a digital subtraction angiography-magnetic resonance imaging (DSA-MRI) device, a positron emission tomography-computed tomography (PET-CT) device, a single photon emission computed tomography-computed tomography (SPECT-CT) device, etc.

The network 120 may facilitate exchange of information and/or data. In some embodiments, one or more components of the imaging system 100 (e.g., the imaging device 110, the terminal 130, the processing device 140, the storage device 150) may send information and/or data to another component(s) in the imaging system 100 via the network 120. For example, the processing device 140 may obtain a user instruction from the terminal 130 via the network 120. As another example, the processing device 140 may obtain imaging data from the imaging device 110 via the network 120. In some embodiments, the network 120 may be any type of wired or wireless network, or combination thereof. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired or wireless network access points such as base stations and/or internet exchange points through which one or more components of the imaging system 100 may be connected to the network 120 to exchange data and/or information.

The terminal 130 include a mobile device 131, a tablet computer 132, a laptop computer 133, or the like, or any combination thereof. In some embodiments, the mobile device 131 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, an accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, the terminal 130 may remotely operate the imaging device 110. In some embodiments, the terminal 130 may operate the imaging device 110 via a wireless connection. In some embodiments, the terminal 130 may receive information and/or instructions inputted by a user, and send the received information and/or instructions to the imaging device 110 or to the processing device 140 via the network 120. In some embodiments, the terminal 130 may receive data and/or information from the processing device 140. In some embodiments, the terminal 130 may be part of the processing device 140. In some embodiments, the terminal 130 may be omitted.

In some embodiments, the processing device 140 may process data obtained from the imaging device 110, the terminal 130, or the storage device 150. For example, the processing device 140 may determine target artifact feature information of one or more artifacts of an image by inputting the image into a target artifact identification model. As another example, the processing device 140 may determine target artifact extent indication information by inputting the image and the target artifact feature information into a target artifact extent determination model. The processing device 140 may be a central processing unit (CPU), a digital signal processor (DSP), a system on a chip (SoC), a microcontroller unit (MCU), or the like, or any combination thereof. In some embodiments, the processing device 140 may be a single server or a server group. The server group may be centralized or distributed. In some embodiments, the processing device 140 may be local or remote. For example, the processing device 140 may access information and/or data stored in the imaging device 110, the terminal 130, and/or the storage device 150 via the network 120. As another example, the processing device 140 may be directly connected to the imaging device 110, the terminal 130, and/or the storage device 150, to access stored information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented on a computing device 200 having one or more components illustrated in FIG. 2 in the present disclosure.

The storage device 150 may store data and/or instructions. In some embodiments, the storage device 150 may store data obtained from the terminal 130 and/or the processing device 140. For example, the storage device 150 may store one or more images obtained from the processing device 140. As another example, the storage device 150 may store a target artifact identification model and/or a target artifact extent determination model. In some embodiments, the storage device 150 may store data and/or instructions that the processing device 140 may execute or use to perform exemplary methods described in the present disclosure. For example, the storage device 150 may store instructions that the processing device 140 may execute or use to determine target artifact feature information and/or target artifact extent indication information. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the imaging system 100 (e.g., the imaging device 110, the terminal 130, the processing device 140). One or more components of the imaging system 100 may access the data or instructions stored in the storage device 150 via the network 120. In some embodiments, the storage device 150 may be directly connected to or communicate with one or more components of the imaging system 100 (e.g., the terminal 130, the processing device 140). In some embodiments, the storage device 150 may be part of the processing device 140.

FIG. 2 is a schematic diagram illustrating hardware and/or software components of an exemplary computing device according to some embodiments of the present disclosure. As illustrated in FIG. 2, the computing device 200 may include a processor 210, a storage 220, an input/output (I/O) 230, and a communication port 240. In some embodiments, the processing device 140 and/or the terminal 130 may be implemented on the computing device 200.

The processor 210 may execute computer instructions (program code) and, when executing the instructions, cause the processing device 140 to perform functions of the processing device 140 in accordance with techniques described herein. The computer instructions may include, for example, routines, programs, objects, components, signals, data structures, procedures, modules, and functions, which perform particular functions described herein. In some embodiments, the processor 210 may process data and/or images obtained from the imaging device 110, the terminal 130, the storage device 150, and/or any other component of the imaging system 100. For example, the processing device 140 may determine target artifact feature information of one or more artifacts of an image by inputting the image into a target artifact identification model. As another example, the processing device 140 may determine target artifact extent indication information by inputting the image and the target artifact feature information into a target artifact extent determination model. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the imaging device 110, the terminal 130, the storage device 150, or any other component of the imaging system 100. In some embodiments, the storage 220 may include a mass storage device, removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage device 150 may store instructions that the processing device 140 may execute or use to determine target artifact feature information and/or target artifact extent indication information.

The I/O 230 may input or output signals, data, and/or information. In some embodiments, the I/O 230 may enable user interaction with the processing device 140. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected to a network (e.g., the network 120) to facilitate data communications. The communication port 240 may establish connections between the processing device 140 and the imaging device 110, the terminal 130, or the storage device 150. The connection may be a wired connection, a wireless connection, or combination of both that enables data transmission and reception. The wired connection may include an electrical cable, an optical cable, a telephone wire, or the like, or any combination thereof. The wireless connection may include Bluetooth, Wi-Fi, WiMAX, WLAN, ZigBee, mobile network (e.g., 3G, 4G, 5G, etc.), or the like, or a combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
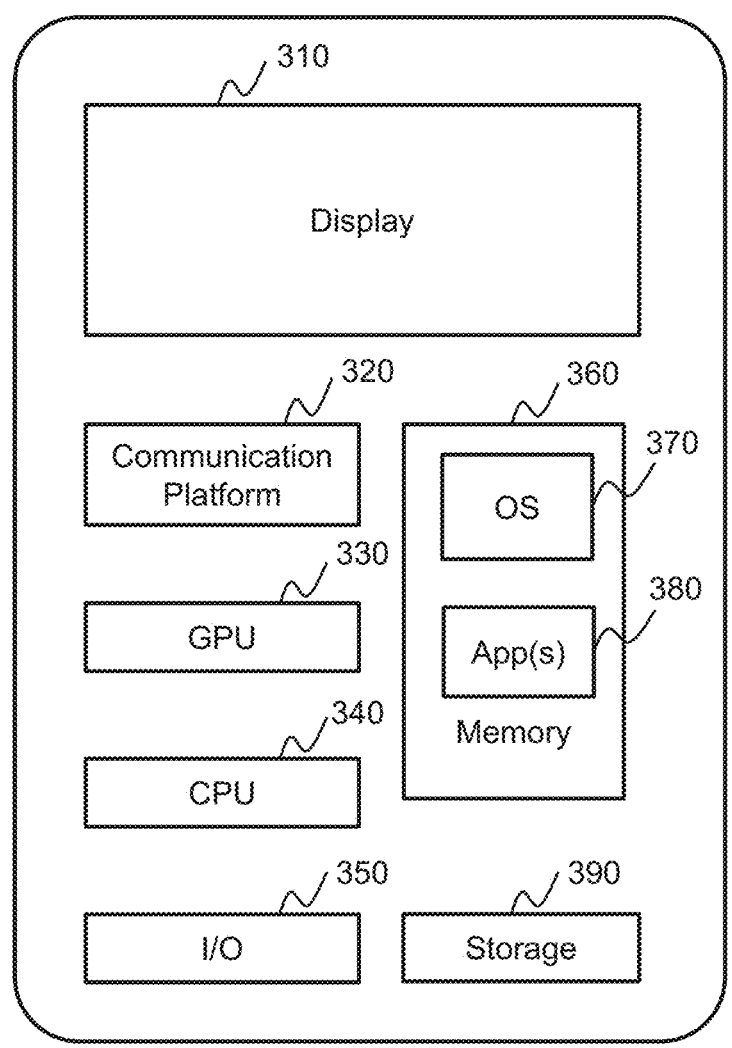
FIG. 3 is a schematic diagram illustrating hardware and/or software components of an exemplary mobile device according to some embodiments of the present disclosure.

FIG. 3 is a schematic diagram illustrating hardware and/or software components of a mobile device according to some embodiments of the present disclosure. In some embodiments, the processing device 140 and/or the terminal 130 may be implemented on the computing device 200. As illustrated in FIG. 3, the mobile device 300 may include a display 310, a communication platform 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to control exposure in medical radiation as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

Figure 4A:
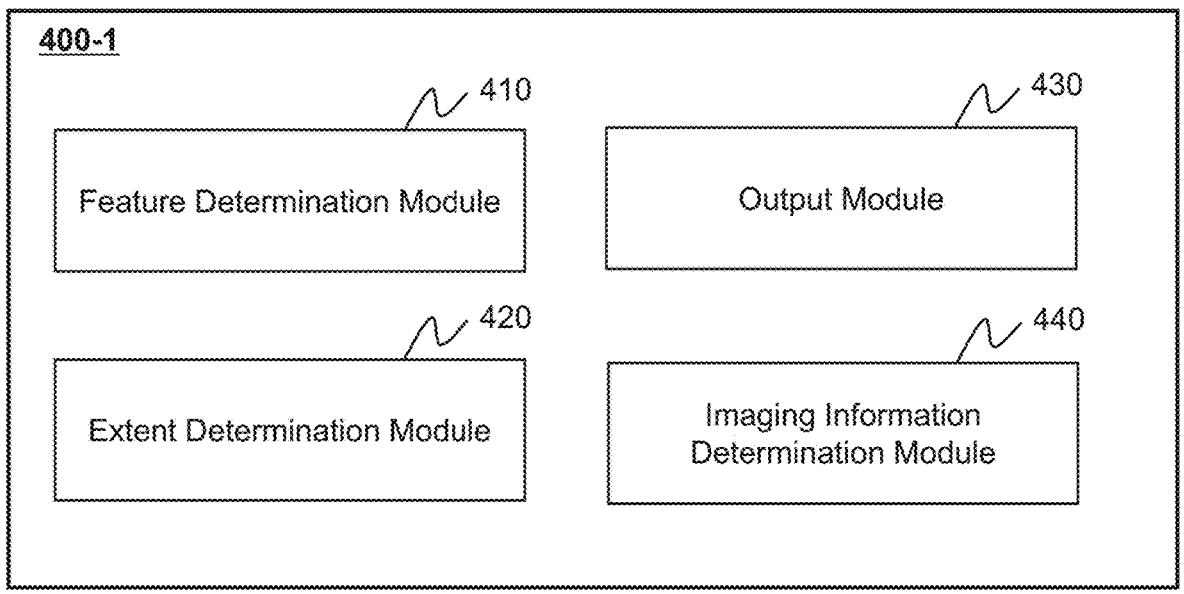
FIG. 4A is a block diagram illustrating an exemplary processing device according to some embodiments of the present disclosure.

FIG. 4A is a schematic block diagram illustrating an exemplary processing device 400-1 according to some embodiments of the present disclosure. In some embodiments, at least a portion of the processing device 140 may be implemented on the processing device 400-1. The processing device 400-1 may include a feature determination module 410, an extent determination module 420, and an output module 430. In some embodiments, the processing device 400-1 may further include an imaging information determination module 440.

The feature determination module 410 may obtain an image of an object; obtain a target artifact identification model; and determine target artifact feature information by inputting the image into the target artifact identification model, the target artifact feature information indicating a feature of one or more artifacts in the image.

The extent determination module 420 may obtain a target artifact extent determination model; and determine target artifact extent indication information by inputting the image and the target artifact feature information into the target artifact extent determination model, the target artifact extent indication information indicating an influence extent of the one or more artifacts on an image quality of the image.

The output module 430 may determine, based on the target artifact extent indication information, whether the influence extent is greater than or equal to an extent threshold; and in response to determining that the influence extent is greater than or equal to the extent threshold, output a notice of the one or more artifacts of the image.

The imaging information determination module 440 may obtain field intensity information (also referred to as magnetic field intensity information) of an imaging device corresponding to the image. The imaging device (e.g., the imaging device 110) may be configured to scan the object to generate the image.

The imaging information determination module 440 may obtain an imaging information identification model corresponding to the field intensity information.

The imaging information determination module 440 may identify the imaging region and the imaging plane of the object by inputting the image into the imaging information identification model.

The imaging information determination module 440 may obtain field intensity information of an imaging device corresponding to the image. The imaging device (e.g., the imaging device 110) may be configured to scan the object to generate the image.

The imaging information determination module 440 may obtain an imaging information identification model corresponding to the field intensity information and the target artifact feature information.

The imaging information determination module 440 may identify the imaging region and the imaging plane of the object by inputting the image into the imaging information identification model.

The modules in the processing device 400-1 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 400-1 may further include a storage module (not shown in FIG. 4A). The storage module may be configured to store data generated during any process performed by any component of the processing device 400-1. As another example, each of the components of the processing device 400-1 may include a storage device. Additionally or alternatively, the components of the processing device 400-1 may share a common storage device.

Figure 4B:
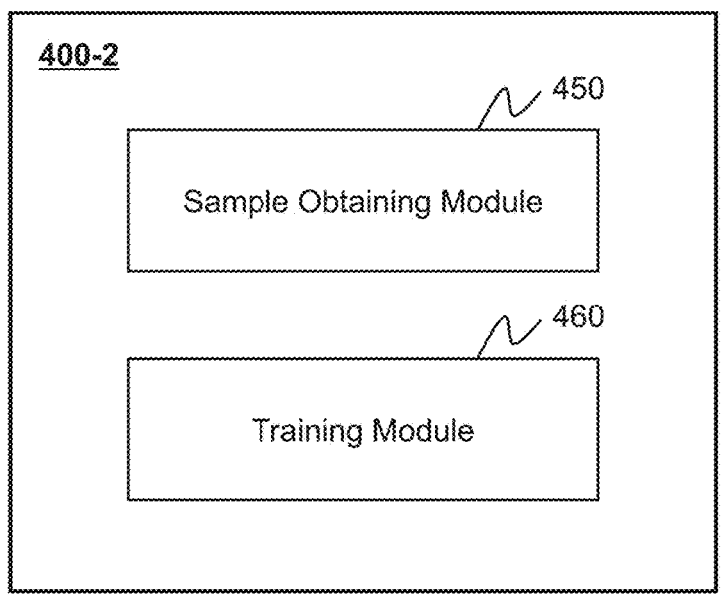
FIG. 4B is a block diagram illustrating an exemplary processing device according to some embodiments of the present disclosure.

FIG. 4B is a schematic block diagram illustrating an exemplary processing device 400-2 according to some embodiments of the present disclosure. The processing device 400-2 may be configured to perform a training process to obtain a model, e.g., a target artifact identification model, a target artifact extent determination model, or an imaging information determination model in the present disclosure. In some embodiments, at least a portion of the processing device 140 may be implemented on the processing device 400-2. In some embodiments, the processing device 400-2 may be implemented on an external device other than the imaging system 100. The processing device 400-2 may include a sample obtaining module 450 and a training module 460.

In some embodiments, the sample obtaining module 450 may obtain a first training sample set; and normalize the image brightness of each first training sample image in the first training sample set based on a Z score (also referred to as a standard score). The training module 460 may obtain the target artifact identification model by training, based on the normalized first training sample set, a first preliminary model.

In some embodiments, the sample obtaining module 450 may obtain a second training sample set; and normalize image brightness of each second training sample image in the second training sample set based on a Z score. The training module 460 may obtain the target artifact extent determination model by training, based on the normalized second training sample set, a second preliminary model.

In some embodiments, the sample obtaining module 450 may obtain a third training sample set; and normalize the image brightness of each third training sample image in the third training sample set based on a Z score. The training module 460 may obtain the imaging information determination model by training, based on the normalized third training sample set, a third preliminary model.

The modules in the processing device 400-1 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 400-2 may further include a storage module (not shown in FIG. 4B). The storage module may be configured to store data generated during any process performed by any component of the processing device 400-2. As another example, each of the components of the processing device 400-2 may include a storage device. Additionally or alternatively, the components of the processing device 400-2 may share a common storage device.

FIG. 5 is a flowchart illustrating an exemplary process for image processing according to some embodiments of the present disclosure. In some embodiments, the process 500 may be implemented in the medical system 100 illustrated in FIG. 1. For example, the process 500 may be stored in a storage medium (e.g., the storage device 150, or the storage 320 of the processing device 140) as a form of instructions, and can be invoked and/or executed by the processing device 140 (e.g., the processor 210 of the processing device 140, or one or more modules in the processing device 140 illustrated in FIG. 4). The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 501, the processing device 140 (e.g., the feature determination module 410) may determine target artifact feature information by inputting an image into a target artifact identification model. The target artifact feature information may indicate a feature of one or more artifacts in the image. In some embodiments, the processing device 140 may obtain an image of an object. The processing device 140 may obtain a target artifact identification model. The processing device 140 may determine target artifact feature information by inputting the image into the target artifact identification model.

In some embodiments, the image may include a medical image, such as a magnetic resonance (MR) image, a computed tomography (CT) image, a positron emission computed tomography (PET) image, a digital radiography (DR) image, an ultra sound (US) image, or a fusion image of the above two modes.

In some embodiments, the processing device 140 may send a scanning instruction to the imaging device 110. After receiving the scanning instruction sent by the processing device 140, the imaging device 110 may scan a region of interest (ROI) of an object (e.g., a patient) and send the imaging data to the processing device 140. The processing device 140 may receive the imaging data sent by the imaging device 110 and generate a medical image corresponding to the ROI based on the imaging data.

For example, taking the medical image as an MR image, the processing device 140 may send a scanning instruction to the imaging device 110. After receiving the scanning instruction sent by the processing device 140, the imaging device 110 may scan the ROI and send the imaging data to the processing device 140. The processing device 140 may receive the imaging data sent by the imaging device 110, and generate a medical image corresponding to the ROI based on the imaging data.

The processing device 140 may input the medical image to a target artifact identification model to determine target artifact feature information of the medical image. In some embodiments, the target artifact identification model may be a machine learning model, or other network models. The machine learning model may include be a deep neural network (DNN), a convolutional neural network (CNN), a recurrent neural network (RNN), etc. When the target artifact identification model is CNN, it may include a V-Net model, a U-Net model, a generative adversarial net model, etc. The present disclosure does not limit the type of the target artifact identification model.

In some embodiments, the target artifact identification model may include a convolution neural network with a specific number of layers, e.g., a convolution neural network with 50 layers including 4 residual blocks, 49 convolution layers, and a full connection layer.

Figure 6:
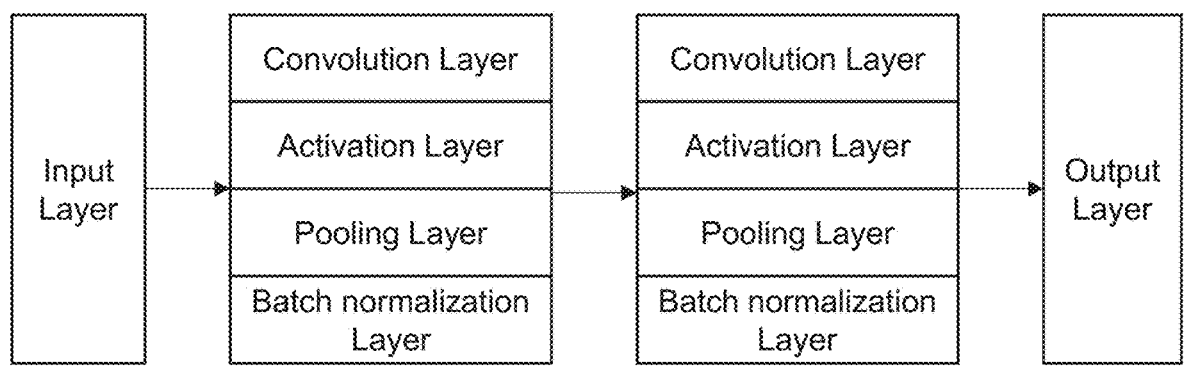
FIG. 6 is a schematic diagram illustrating an exemplary structure of a neural network model according to some embodiments of the present disclosure.

Merely by way of example, FIG. 6 is a schematic diagram illustrating an exemplary structure 600 of a neural network model according to some embodiments of the present disclosure. In some embodiments, the target artifact identification model may include the structure 600.

An activation function may adopt a rectified linear unit (RELU) function. As shown in FIG. 6, the structure 600 may include an input layer, an output layer, and one or more stages. Each of the one or more stages may include a convolution layer, an activation layer, a pooling layer, and a batch normalization layer.

The RELU function may be represented as Equation (1) below:

$$F_n = R(W_n * F_{n-1} + B_n) \quad (1)$$

where R is the nonlinear activation function RELU, $W_n$ and $B_n$ is the weight and offset of the convolution layer in a feature extraction operation, respectively, $F_{n-1}$ is a feature image of the convolution output before the current feature extraction operation, and $F_n$ is the output feature image obtained in the current feature extraction operation.

After the target artifact identification model performs identification processing on the medical image, the target artifact feature information may be output. The target artifact feature information may be used to indicate a feature of one or more artifacts in the medical image. The target artifact feature information may include at least one of the size information of the artifact, the position information of the artifact, the count information of the one or more artifacts, and the type information of the one or more artifacts.

The type information of the one or more artifacts may include zipper artifact, spark artifact, involuntary motion artifact, respiratory artifact, vascular pulsation artifact, etc. The type information of the one or more artifacts may also be divided into device artifact and artificial artifact based on the reason causing the artifact. The device artifact may include, for example, measurement error artifact of imaging system, X-ray beam hardening artifact, high voltage fluctuation artifact of imaging system, temperature drift artifact of electronic circuit, detector drift artifact, etc. The artificial artifact may include, for example, artifact of the movement of the body position of the detection subject, artifact of the peristalsis of organs in the body, artifacts of metal implants in the body, etc.

In 502, the processing device 140 (e.g., the extent determination module 420) may determine target artifact extent indication information by inputting the image and the target artifact feature information into a target artifact extent determination model. The target artifact extent indication information may indicate an influence extent of the one or more artifacts on an image quality of the image. In some embodiments, the processing device 140 may obtain a target artifact extent determination model. The processing device 140 may determine target artifact extent indication information by inputting the image and the target artifact feature information into the target artifact extent determination model.

In some embodiments, after inputting the medical image to the target artifact identification model and obtaining the target artifact feature information output by the target artifact identification model, the processing device 140 may input the medical image and the target artifact feature information to the target artifact extent determination model. The target artifact extent determination model may determine the influence degree of the one or more artifacts on the image quality of the medical image based on the target artifact feature information.

The target artifact extent determination model may recognize the medical image, and divide the medical image into a region of interest and a region of non-interest. The region of interest may be a scanned part (or an imaging part) included in the medical image. For example, when the scanned part is the brain, the image includes not only the image information corresponding to the brain, but also a small part of the image information corresponding to the neck. In the target artifact extent determination model, the neck in the medical image may be regarded as a region of non-interest, and the brain in the medical image may be regarded as a region of interest.

After determining the region of interest in the medical image, the target artifact extent determination model may determine the influence degree of the artifact in the medical image on the image quality of the medical image based on the position information of the region of interest in the medical image, the feature information of the region of interest, and the feature information of the one or more artifacts.

For example, the scanned part (also referred to imaging region or anatomical portion) corresponding to the medical image is the brain, the target artifact extent determination model may process the medical image to identify brain tissue such as brain white matter and gray matter in the medical image as regions of interest, and identify the neck in the medical image as regions of non interest. The target artifact degree model may determine that the target artifact in the medical image is the neck motion artifact based on the target artifact feature information. Because the neck motion artifact has little influence on the brain tissue, the target artifact extent determination model may determine that the artifact in the medical image has little influence on the image quality of the medical image.

In some embodiments, the target artifact extent determination model may be based on the signal-to-noise ratio of the medical image with target artifact contrast, or the image quality threshold (e.g., signal-to-noise ratio threshold, contrast threshold, or the like) to determine the influence degree of artifacts in the medical image on the image quality of the medical image. If a difference between the signal-to-noise ratio, contrast, etc. of the medical image with target artifacts and the image quality threshold is greater, the target artifact extent determination model may determine that the influence of the artifacts on the image quality of medical images is greater. If a difference between the signal-to-noise ratio and contrast of the medical image with the target artifacts and the image quality threshold is smaller, the target artifact extent determination model may determine that the artifacts in the medical image have less influence on the image quality of the medical image.

In some embodiments, the target artifact extent determination model may determine the influence degree of the artifact in the medical image on the image quality of the medical image based on the position relationship between the target artifact and the scanned part. If the distance between the target artifact and the scanned part is less than a predetermined distance threshold, the target artifact extent determination model may determine that the artifact in the medical image has a great influence on the image quality of the medical image. If the distance between the target artifact and the scanned part is greater than or equal to the predetermined distance threshold, the target artifact extent determination model may determine that the artifact in the medical image has little influence on the image quality of the medical image.

In some embodiments, the target artifact extent determination model may determine the influence degree of the artifact in the medical image on the image quality of the medical image based on the size of the target artifact. If the size of the target artifact exceeds a predetermined size threshold, the target artifact extent determination model may determine that the artifact in the medical image has a greater influence on the image quality of the medical image. If the size of the target artifact is less than the predetermined area threshold, the target artifact extent determination model may determine that the artifact in the medical image has less influence on the image quality of the medical image.

In some embodiments, the target artifact extent determination model may determine the influence degree of artifact in the medical image on the image quality of the medical image based on the number (or count) of target artifacts. If the number of target artifacts exceeds a predetermined number threshold, the target artifact extent determination model may determine that the artifacts in the medical image have a greater influence on the image quality of the medical image. If the number of target artifacts is less than the predetermined number threshold, the target artifact extent determination model may determine that the artifacts in the medical image have less influence on the image quality of the medical image.

In some embodiments, the target artifact extent determination model may determine the influence degree of artifact in the medical image on the image quality of the medical image based on the type of the target artifact. If the type of the target artifact belongs to a type of artifact that is inevitable in the scanning process of the scanned part, the target artifact extent determination model may determine that the artifact in the medical image has little influence on the image quality of the medical image. If the type of target artifact belongs to a type of artifact that may be avoided in the scanning process of the scanned part, the target artifact extent determination model may determine that the artifact in the medical image has a great influence on the image quality of the medical image.

In some embodiments, the target artifact extent determination model may be a machine learning model, or other network models. The machine learning model may include be a deep neural network (DNN), a convolutional neural network (CNN), a recurrent neural network (RNN), etc. When the target artifact extent determination model is CNN, it may include a V-Net model, a U-Net model, a generative adversarial net model, etc. The present disclosure does not limit the type of the target artifact extent determination model.

In some embodiments, the target artifact extent determination model may include a convolution neural network with a specific number of layers, e.g., a convolution neural network with 50 layers including 4 residual blocks, 49 convolution layers, and a full connection layer. In some embodiments, the target artifact extent determination model may include the structure 600 illustrated in FIG. 6.

In 503, in response to a determination that the influence extent is greater than or equal to an extent threshold, the processing device 140 (e.g., the output module 430) may output a notice of the one or more artifacts of the image. In some embodiments, the processing device 140 may determine, based on the target artifact extent indication information, whether the influence extent is greater than or equal to an extent threshold. In response to determining that the influence extent is greater than or equal to the extent threshold, the processing device 140 may output a notice of the one or more artifacts of the image.

In some embodiments, the notice may be prompt information of the one or more artifacts of the image. In some embodiments, the notice may include a prompt identification, which is used to prompt a user (e.g., a doctor, a technician, an engineer, etc.) to confirm whether to accept the one or more artifacts in the medical image and whether it is necessary to re-scan the ROI corresponding to the medical image. In some embodiments, the notice may include a warning mark for indicating that there are one or more artifacts affecting the image quality in the medical image. In some embodiments, the notice may include a specific imaging sequence, which may correspond to the medical image affected by artifacts, and the imaging sequence is a time sequence in the whole medical imaging scanning.

In some embodiments, in order to facilitate determining the influence degree of artifacts in the medical image on the quality of the medical image, the target artifact extent determination model may grade the target artifact extent indication information when outputting the target artifact extent indication information. For example, the processing device 140 may classify the target artifact extent indication information into level I, level II, level III and level IV. The level I may indicate that the medical image is normal and not affected by artifacts. The level II may indicate that the artifacts have a slight influence on the processed medical image. The level III may indicate a moderate influence of artifacts on the medical image. The level IV may indicate that the artifacts have a serious influence on the processed medical image.

For example, the classification of target artifact extent indication information may be determined by multiple researchers studying multiple scanned images including artifacts, or by multiple researchers labeling the influence degree of multiple scanned images including artifacts, and using the labeled scanned images for machine learning model training.

For example, assuming that the predetermined artifact extent threshold is level II, when the artifact extent indication information output by the target artifact extent determination model is level III or level IV, the processing device 140 may output the prompt information. The processing device 140 may direct a screen to output prompt information by presenting prompt sound, red light, rescanning prompt text on the display screen, or displaying the scanning sequence corresponding to the medical image with the one or more artifacts on the display screen. The present disclosure does not limit the way in which the processing device 140 may output the prompt information.

In some embodiments, after completing a scanning operation, the imaging device 110 may obtain a plurality of medical images based on the imaging data, and each medical image may correspond to a different scanning sequence. After determining the artifact extent of a plurality of medical images through the target artifact extent determination model, the processing device 140 may determine a target medical image from the plurality of medical images based on the artifact extent indication information output by the target artifact extent determination model and the predetermined artifact extent threshold. The influence degree of the artifact of the target medical image may be greater than or equal to the predetermined artifact extent threshold. The processing device 140 may output the scanning sequence corresponding to the target medical image, thereby prompting the user to confirm whether to accept the artifacts in the target medical image and whether it is necessary to re-scan the scanned part corresponding to the target medical image.

Figure 7:
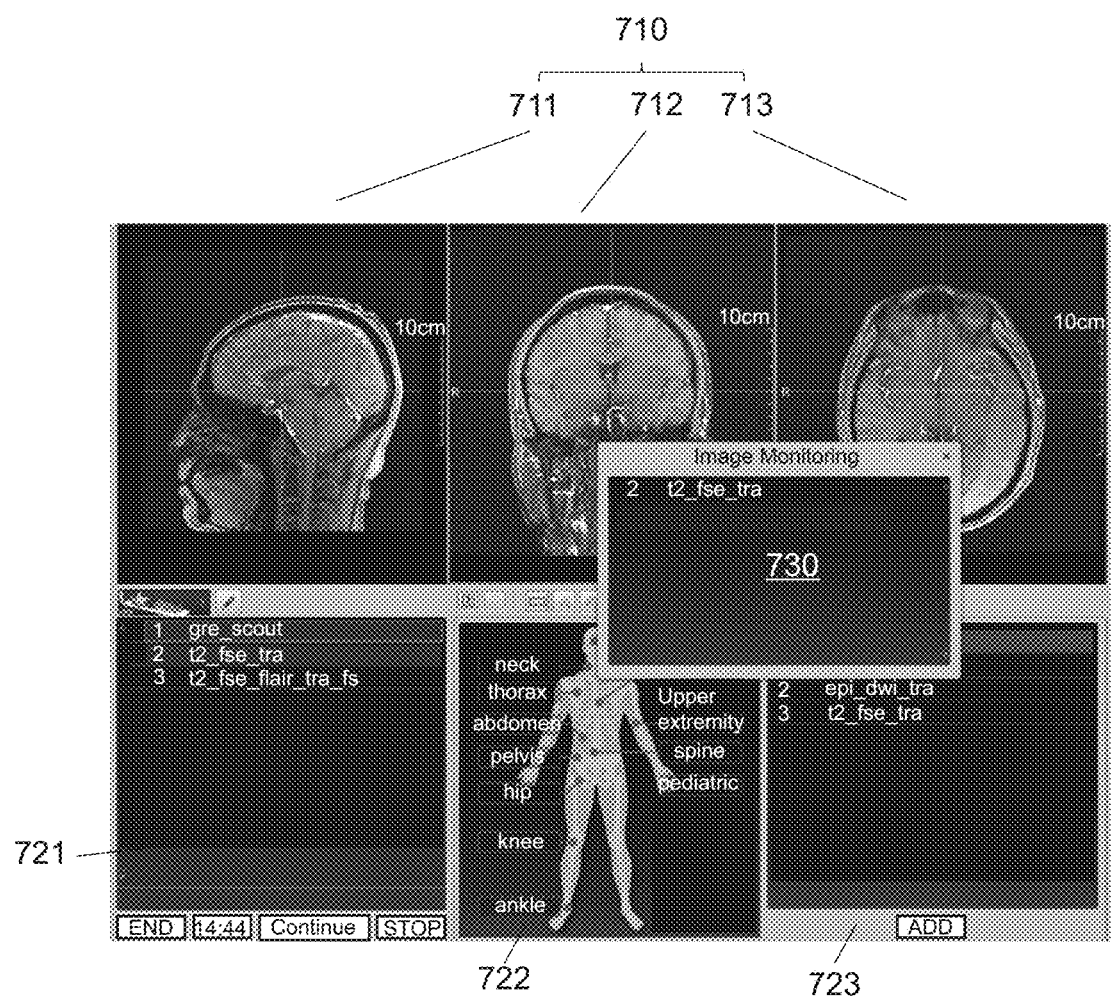
FIG. 7 is a schematic diagram of an exemplary scanning interface of an imaging system according to some embodiments of the present disclosure.

FIG. 7 is a schematic diagram of an exemplary scanning interface 700 of the imaging system 100 according to some embodiments of the present disclosure. In some embodiments, the scanning interface 700 may be displayed in the processing device 140 and/or the terminal 130. The region 710 including regions 711-713 is the preview image interface in three directions of the scanning subject. For example, the region 711 is configured to preview the sagittal plane of the subject (e.g., the brain as shown in FIG. 7), the region 712 is configured to preview the coronal plane of the subject, and the region 713 is configured to preview the cross section of the subject. The region 721 is a region configured to display one or more scan protocols used to perform the current scan, the region 722 is a region configured to display components of the subject, and the region 723 is a region configured to display one or more recommended protocols for the current scan. The region 721 may include multiple categories of scan protocols to be executed by the detection subject for the current scan (from top to bottom, with doctor setting or system automatic setting). The region 722 is used to display multiple scanned parts (components) of the object, and each scanned part in this area is linked to the region 723. A scanned part may be clicked to display the executable recommended scan protocol in the region 723, and the recommended scan protocol selected in the region 723 may be added to the region 721. As shown in the region 721 in FIG. 7, two scanning sequences numbered 1 and 2 have been executed. The processing device 140 processes a medical image based on the process 500 shown in FIG. 5, and outputs prompt information 730 on the interface 700. The prompt information 730 includes the scanning sequence numbered 2 corresponding to the medical image affected by the artifacts. Further, the user may select to re-scan the scanning sequence numbered 2 based on the prompt information.

In some embodiments, the prompt information is still the scanning sequence numbered 2 corresponding to the medical image affected by the artifacts (the scanning sequence is affected by artifacts), the operation may generate a recommended scan protocol in the region 723 based on the sequence and implementation functions of multiple categories of scan protocol sets in the region 721. The recommended scan protocol may have different categories or timing relative to multiple categories of scan protocol sets in the region 721, but may realize the same image display effect. For example, the recommended scan protocol may be automatically generated by the protocol recommendation model trained based on big data. The protocol recommendation model may be obtained by training neural network by using multiple groups of scan protocols. For example, the multiple groups of scan protocol include a first group of sample scan protocols and a second group of sample scan protocols with equal or similar image display effects. The first group of sample scan protocols may have different kinds of sub scan protocols relative to the second group of sample scan protocols. For example, the first set of sample scan protocols may have sub scan protocols with different timing relative to the second set of sample scan protocols.

In some embodiments, the target artifact identification model and/or the target artifact extent determination model may be obtained from the storage device (e.g., the storage device 150, the storage 220 of the processing device 140) of the imaging system 100, or an external device.

In the above process for processing medical image, the processing device 140 inputs the medical image scanned by the imaging device 110 into the target artifact identification model, and automatically obtains the target artifact feature information. The processing device 140 inputs the medical image and the target artifact feature information to the target artifact extent determination model, and automatically obtains the artifact extent indication information. In addition, when the influence degree of the artifacts in the medical image on the image quality of the medical image is greater than or equal to the predetermined artifact influence extent threshold, the processing device 140 outputs prompt information. In the above process, after the medical image is input into the target artifact identification model, the feature information of the target artifacts may be accurately obtained. Then, after inputting the feature information of the medical image and the target artifacts into the target artifact extent determination model, the target artifact extent determination model may accurately and effectively determine the influence degree of the artifacts in the medical image on the image quality of the medical image based on the feature information of the target artifacts. In addition, the processing device 140 may also compare the influence degree of the artifacts in the medical image on the image quality of the medical image with the predetermined artifact influence extent threshold, to accurately determine whether the medical image needs to be scanned or re-scanned, and further ensure the image quality.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, before inputting the medical image into the target artifact identification model, it is necessary to determine the target artifact identification model corresponding to the medical image based on the imaging region and the imaging plane in the medical image. Therefore, it is necessary to recognize the imaging region and the imaging plane in the medical image. As shown in FIG. 8, identifying the imaging region and the imaging plane in the medical image may include the following operations.

Firstly, it should be noted that due to the different types of artifacts corresponding to different imaging regions, the degree of motion sensitivity corresponding to different regions is different. Therefore, before inputting the medical image into the target artifact identification model, it is necessary to determine the target artifact identification model corresponding to the medical image based on the imaging region and the imaging plane in the medical image.

In 801, the processing device 140 (e.g., the imaging information determination module 440) may obtain field intensity information (also referred to as magnetic field intensity information) of an imaging device corresponding to the image. The imaging device (e.g., the imaging device 110) may be configured to scan the object to generate the image.

Specifically, due to the different field strength of the imaging device 110, the definition of the image scanned by the imaging device 110 is also different. Therefore, in order to improve the recognition accuracy of the imaging region and the imaging plane in the medical image, it is necessary to obtain the field intensity (also referred to as field strength) information of the imaging device 110.

In some embodiments, the processing device 140 may display the input interface to the user, and the user may input the field strength information of the imaging device 110 in the input interface displayed by the processing device 140, so that the processing device 140 may obtain the field strength information of the imaging device 110 corresponding to the medical image. In some embodiments, the medical image has label information, and the processing device 140 automatically reads the label information, and then directly obtains the field strength information through the label information.

In some embodiments, the processing device 140 may use the predetermined resolution recognition algorithm to recognize the resolution of the medical image to determine the resolution of the medical image, and determine the field strength information of the imaging device 110 corresponding to the medical image based on the resolution of the medical image.

For example, taking the imaging device 110 as the nuclear magnetic resonance device as an example, when the field strength of the nuclear magnetic resonance device is 3.0 T, the image scanned by the nuclear magnetic resonance device is clearer. When the field strength of the nuclear magnetic resonance device is 1.51 the image scanned by the nuclear magnetic resonance device is slightly blurred. The processing device 140 uses the predetermined resolution recognition algorithm to recognize the resolution of the medical image to determine the resolution of the medical image. When the resolution of the medical image is greater than the predetermined resolution threshold, it is determined that the field strength of the NMR device corresponding to the medical image is 3.0 T. When the resolution of the medical image is less than or equal to the predetermined resolution, it is determined that the field strength of the MR device corresponding to the medical image is 1.5 T. The predetermined resolution threshold may be determined after the processing device 140 recognizes the separation rate of multiple images and compares them. The multiple images are obtained by scanning the same part with MR device with different field strengths.

In 802, the processing device 140 (e.g., the imaging information determination module 440) may obtain an imaging information identification model corresponding to the field intensity information.

The imaging information identification model may not only identify the imaging region in the medical image, but also identify the imaging plane corresponding to the imaging region.

In some embodiments, the database of the processing device 140 may store different imaging information identification models for the imaging device 110 with different field strengths, and store the corresponding relationship between the field strength information and imaging information identification models. After determining the magnetic resonance field strength information corresponding to the medical image, the processing device 140 may find the imaging information identification model corresponding to the field strength information in the database. Based on the search results, the imaging information identification model corresponding to the field strength information of the imaging device 110 is determined.

In some embodiments, after determining that the field strength of the imaging device 110 corresponding to the medical image is 3.0 T, the processing device 140 may search the imaging information identification model corresponding to the imaging device 110 with a field strength of 3.0 T in the database. The processing device 140 may call the imaging information identification model in the database to identify the imaging region and the imaging plane in the medical image.

In 803, the processing device 140 (e.g., the imaging information determination module 440) may identify the imaging region and the imaging plane of the object by inputting the image into the imaging information identification model.

In some embodiments, the processing device 140 may determine the imaging information identification model based on the field strength information of the imaging device 110, and then input the medical image into the imaging information identification model. The imaging information identification model extracts the features of the medical image, and determines the imaging region and the imaging plane included in the medical image based on the extracted features.

The imaging information identification model may be machine learning network model or may be other network models. The machine learning network model may be deep neural networks (DNN), convolutional neural networks (CNN) or recurrent neural network (RNN), etc. When the imaging information identification model is CNN, it may be V-Net model, U-Net model, generative adversarial networks model, etc. The embodiments of the present disclosure may not specifically limit the type of imaging information identification model.

For example, when the imaging information identification model is CNN, the structure of the imaging information identification model may be similar to the structure 600 in connection with the description in FIG. 6.

In some embodiments of the present disclosure, because the field strength of the imaging device 110 is different, the definition of the image obtained after scanning is also different. In the above process, the processing device 140 obtains the field strength information of the imaging device 110 corresponding to the medical image, and obtains the imaging information identification model corresponding to the field strength information of the imaging device 110. It may ensure that the field strength information of the imaging device 110 corresponding to the medical image corresponds to the imaging information identification model, to ensure the accuracy of the imaging region and the imaging plane included in the medical image recognized by the imaging information identification model. In addition, the processing device 140 inputs the medical image to the imaging information identification model to obtain the imaging region and the imaging plane included in the medical image, so that the artifacts in the medical image may be recognized based on the imaging region and the imaging plane included in the medical image, to improve the accuracy of medical image processing.

In some embodiments, the processing device 140 may determine the target artifact identification model based on at least one of the field strength information, the imaging region, and the imaging plane.

For example, the processing device 140 may determine the target artifact identification model corresponding to the field strength information of the imaging device 110.

Specifically, the database of the processing device 140 may store different target artifact identification models for imaging device 110s with different field strengths, and store the corresponding relationship between the field strength information of the imaging device 110 and the target artifact identification model. After determining the magnetic resonance field strength information corresponding to the medical image, the processing device 140 may find the target artifact identification model corresponding to the field strength information corresponding to the medical image in the database. Based on the search results, the target artifact identification model corresponding to the field strength information of imaging device 110 is determined.

In some embodiments, after determining the imaging region and the imaging plane included in the medical image by the processing device 140, the processing device 140 may determine the target artifact identification model corresponding to the imaging region and the imaging plane based on the imaging region and the imaging plane included in the medical image.

For example, when the imaging region is the chest and the imaging plane is the coronal position, the chest in the medical image is easily affected by respiratory artifacts due to pulmonary respiration. Alternatively, the recognition of respiratory artifacts in coronal chest scan images may be relatively rough. Therefore, when inputting the medical image into the target artifact identification model, it is first necessary to determine the imaging region and the imaging plane in the medical image. After determining that the imaging region of the medical image is the chest and the imaging plane is the coronal position, the medical image is input into the target artifact identification model corresponding to the coronal chest scanning image.

For another example, a variety of artifact recognition models may be stored in the processing device 140 database, and the corresponding relationship between the imaging region and the imaging plane, and the artifact recognition model is stored. Different artifact recognition models focus on identifying different types of artifact corresponding to different imaging regions and imaging planes. After determining the imaging region and the imaging plane in the medical image by processing device 140, the corresponding relationship between the imaging region and the imaging plane and the artifact recognition model may be found in the database. Based on the corresponding relationship between the imaging region and the imaging plane found and the target artifact identification model, the target artifact identification model corresponding to the imaging region and the imaging plane in the medical image is determined.

For example, after determining that the imaging region in the medical image is the chest and the imaging plane is the coronal position, the processing device 140 may find the corresponding relationship between the imaging region and the imaging plane and the target artifact identification model in the database. The processing device 140 determines the target artifact identification model corresponding to the coronal chest medical image as the target artifact identification model based on the corresponding relationship between the imaging region and the imaging plane and the artifact identification model. The processing device 140 determines the artifact identification model corresponding to the imaging region and the imaging plane in the medical image as the target artifact identification model.

For another example, the processing device 140 first selects the candidate artifact identification model matching the field strength information based on the field strength information. Then, the processing device 140 determines the target artifact identification model matching the target artifact feature information from the candidate imaging information identification model based on the imaging region and the imaging plane.

For another example, the processing device 140 may select a candidate artifact identification model matching the imaging region and the imaging plane based on the imaging region and the imaging plane. Then, the processing device 140 may determine the target artifact identification model matching the field strength information from the candidate imaging information identification model based on the field strength information.

In some embodiments of the present disclosure, the processing device 140 determines the target artifact identification model based on at least one of the field strength information, the imaging region and the imaging plane, ensuring the matching of the target artifact identification model with the field strength information, the imaging region and the imaging plane. Thus, the accuracy of artifact feature information in the medical image recognized by the target artifact identification model is guaranteed.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 9:
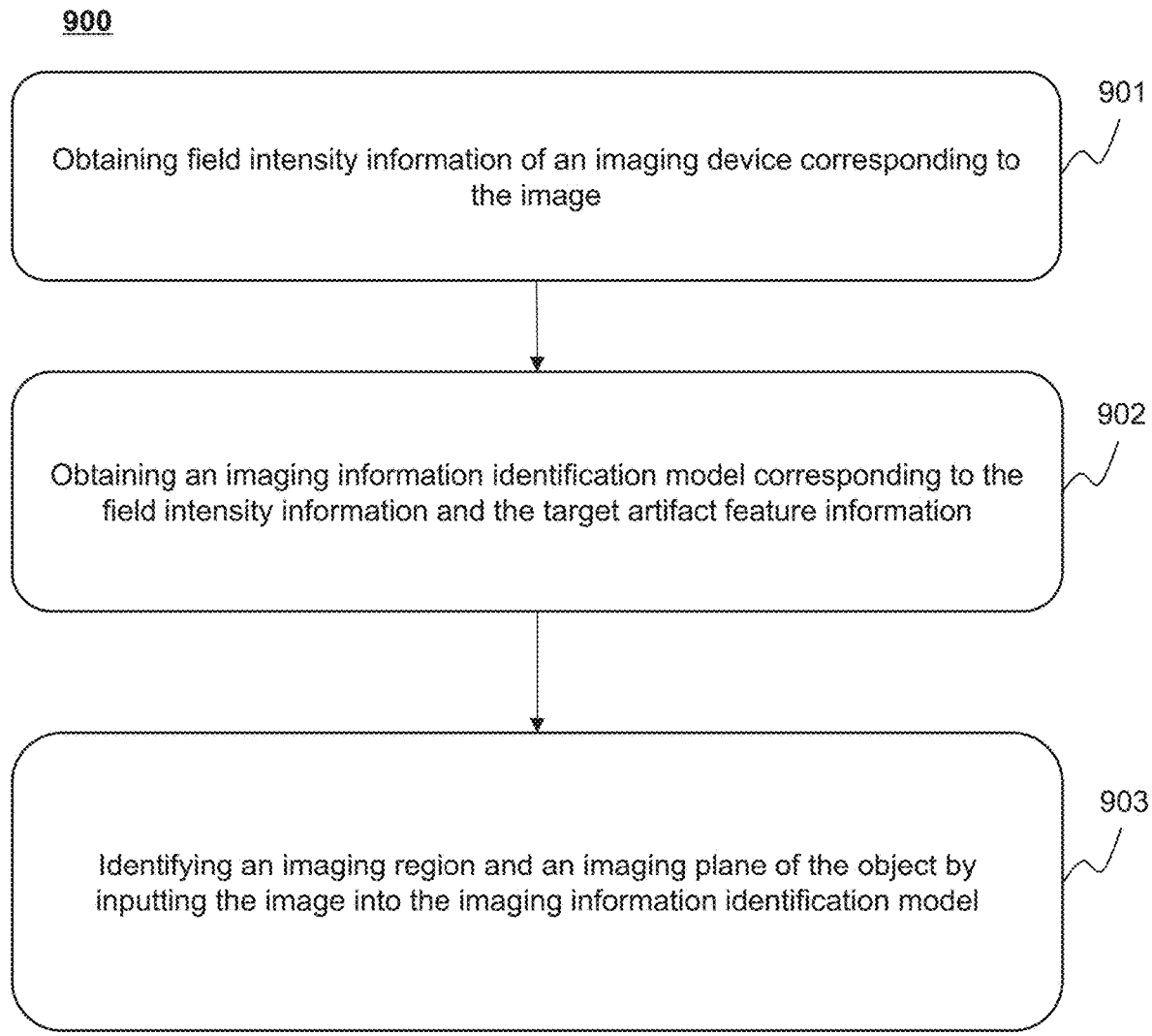
FIG. 9 is a flowchart illustrating an exemplary process for identifying an imaging region and an imaging plane in an image according to some embodiments of the present disclosure.

In some embodiments of the present disclosure, after the medical image is input to the target artifact identification model, it is necessary to determine the target artifact extent determination model corresponding to the medical image based on the imaging region and the imaging plane in the medical image. Therefore, it is necessary to recognize the imaging region and the imaging plane in the medical image. As shown in FIG. 9, identifying the imaging region and the imaging plane in the medical image may include the following operations.

In 901, the processing device 140 (e.g., the imaging information determination module 440) may obtain field intensity information of an imaging device corresponding to the image. The imaging device (e.g., the imaging device 110) may be configured to scan the object to generate the image.

Specifically, due to the different field strength of the imaging device 110, the definition of the image scanned by the imaging device 110 is also different. Therefore, in order to improve the recognition accuracy of the imaging region and the imaging plane in the medical image, it is necessary to obtain the field strength information of the imaging device 110.

For example, the processing device 140 may display the input interface to the user, and the user inputs the field strength information of the imaging device 110 in the input interface displayed by the processing device 140, so that the processing device 140 may obtain the field strength information of the imaging device 110 corresponding to the medical image. Alternatively, the medical image may have label information, and the processing device 140 automatically reads the label information, and then directly obtains the field strength information through the label information.

For another example, the processing device 140 may use the predetermined resolution recognition algorithm to recognize the resolution of the medical image, to determine the resolution of the medical image, and determine the field strength information of the imaging device 110 corresponding to the medical image based on the resolution of the medical image.

For example, taking the imaging device 110 as the nuclear magnetic resonance (NMR) device as an example, when the field strength of the nuclear magnetic resonance device is 3.0 T, the image scanned by the nuclear magnetic resonance device is clearer. When the field strength of the nuclear magnetic resonance device is 1.5 T, the image scanned by the nuclear magnetic resonance device is slightly blurred. The processing device 140 may use the predetermined resolution recognition algorithm to recognize the resolution of the medical image, to determine the resolution of the medical image. When the resolution of the medical image is greater than the predetermined resolution threshold, it is determined that the field strength of the NMR device corresponding to the medical image is 3.0 T. When the resolution of the medical image is less than or equal to the predetermined resolution, it is determined that the field strength of the NMR device corresponding to the medical image is 1.5 T. The predetermined resolution threshold may be determined after the processing device 140 recognizes the separation rate of multiple images and compares them. The multiple images are obtained by scanning the same part with NMR device with different field strengths.

In 902, the processing device 140 (e.g., the imaging information determination module 440) may obtain an imaging information identification model corresponding to the field intensity information and the target artifact feature information.

The imaging information identification model may not only identify the imaging region in the medical image, but also identify the imaging plane corresponding to the scanned part.

Specifically, because the medical images generated by imaging devices with different field strengths have different intelligibility, the imaging information identification model corresponding to field strength information of different imaging devices are different. In addition, because different target artifact feature information corresponds to different imaging regions and imaging planes, different target artifact feature information corresponds to different imaging information identification models. In conclusion, the processing device 140 needs to determine the imaging information identification model based on the field strength information of imaging device 110 and the feature information of target artifact.

Because the influence degree of target artifact feature information on different imaging regions and imaging regions in different imaging planes is different, before determining the target artifact extent determination model, it is necessary to use the imaging information identification model to identify the imaging region and the imaging plane in the medical image.

For example, the processing device 140 may select the candidate imaging information identification model matching the field strength information based on the field strength information. Then, the processing device 140 may determine the imaging information identification model matching the target artifact feature information from the candidate imaging information identification model based on the target artifact feature information.

Specifically, the database of processing device 140 may store different imaging information identification models for imaging device 110s with different field strengths, and store the corresponding relationship between imaging device 110 field strength information and imaging information identification models. After determining the magnetic resonance field strength information corresponding to the medical image, the processing device 140 may find the imaging information identification model corresponding to the field strength information corresponding to the medical image in the database. Based on the search results, the candidate imaging information identification model corresponding to the field strength information of imaging device 110 is determined. After the processing device 140 determining the candidate imaging information identification model, the imaging information identification model matching the target artifact feature information may be determined from the candidate imaging information identification model based on the target artifact feature information.

For example, after determining that the field strength of the imaging device 110 corresponding to the medical image is 3.0 T, the processing device 140 may search the imaging information identification model corresponding to the imaging device 110 with the field strength of 3.0 T in the database, and select five candidate imaging information identification models corresponding to the imaging device 110 with the field strength of 3.0 through searching the processing device 140. The processing device 140 may determine the imaging information identification model matching the target artifact feature information from five candidate imaging information identification models based on the target artifact feature information.

For another example, the processing device 140 may select the candidate imaging information identification model matching the target artifact feature information based on the target artifact feature information. Then, the processing device 140 may determine the imaging information identification model matching the field strength information from the candidate imaging information identification model based on the field strength information.

Specifically, the database of the processing device 140 may store different imaging information identification models for different target artifact feature information, and store the corresponding relationship between the target artifact feature information and the imaging information identification model. After determining the target artifact feature information of the target artifact in the medical image, the processing device 140 may find the imaging information identification model corresponding to the target artifact feature information in the database. Based on the search results, the candidate imaging information identification model corresponding to the target artifact feature information is determined. After the processing device 140 determines the candidate imaging information identification model, the imaging information identification model matching the target artifact feature information may be determined from the candidate imaging information identification model based on the field strength information of the imaging device 110.

In 903, the processing device 140 (e.g., the imaging information determination module 440) may identify the imaging region and the imaging plane of the object by inputting the image into the imaging information identification model.

Specifically, the processing device 140 determines the imaging information identification model based on the field strength information and the target artifact feature information, and then inputs the medical image into the imaging information identification model. The imaging information identification model extracts the features of the medical image, and determines the imaging region and the imaging plane included in the medical image based on the extracted features.

The imaging information identification model may be machine learning network model, of course, it may also be other network models. The machine learning network model may be deep neural networks (DNN), convolutional neural networks (CNN) or recurrent neural network (RNN), etc. When the imaging information identification model is CNN, it may be V-net model, U-net model, generative adversarial networks model, etc. The embodiments of the present disclosure may not specifically limit the type of imaging information identification model.

For example, when the imaging information identification model is CNN, the structure of the imaging information identification model may be similar to the structure 600 in connection with the description in FIG. 6.

In some embodiments of the present disclosure, due to the different field strength of the imaging device 110, the definition of the image scanned by the imaging device 110 is also different. In addition, the influence of target artifact feature information on different scanned parts and scanned parts in different imaging planes is different. In the above method, the processing device 140 obtains the field strength information of the imaging device 110 corresponding to the medical image. The imaging information identification model is determined based on the field strength information of the imaging device 110 and the feature information of the target artifact. The medical image is input into the imaging information identification model to obtain the scanned position and scanning orientation included in the medical image. Thus, it is ensured that the field strength information and target artifact feature information corresponding to the medical image correspond to the imaging information identification model, to ensure the accuracy of the scanned position and imaging plane included in the medical image recognized by the imaging information identification model. In addition, the processing device 140 inputs the medical image into the imaging information identification model to obtain the imaging region and the imaging plane included in the medical image, so that the target artifact extent determination model may be determined based on the imaging region and the imaging plane included in the medical image, to improve the accuracy of medical image processing.

In some embodiments of the present disclosure, the processing device 140 may determine the target artifact extent determination model based on at least one of the field strength information, target artifact feature information, scanned position and scanning orientation.

For example, since the field strength information of the imaging device 110 affects the clarity of the medical image, and the clarity of the medical image may affect the artifact extent indication information output by the target artifact identification model. For example, when the field strength information of imaging device 110 is large, the definition of medical image will be high. When the field strength information of imaging device 110 is small, the clarity of medical images to be processed will be low. The same artifact feature information may have a lower influence on the medical image with higher definition, and a greater influence on the medical image with lower definition. Therefore, when determining the target artifact extent determination model, it may be necessary to consider the influence of imaging device 110 field strength information on the target artifact extent determination model. For example, when the field strength information of imaging device 110 is small, the determined target artifact identification model is more refined.

For another example, since the artifacts of different feature information have different degrees of influence on the processed medical image, the target artifact feature information may also affect the artifact extent indication information output by the target artifact identification model. For example, due to lung breathing, when the medical image is a lung scanning image, lung breathing is inevitable. Therefore, respiratory artifacts have little effect on lung scanning images. Therefore, when determining the target artifact extent determination model, it may be necessary to consider the influence of the target artifact feature information on the target artifact extent determination model.

For another example, because different scanning parts and imaging planes are affected by artifacts differently, different scanning parts and imaging planes may also affect the artifact extent indication information output by the target artifact identification model. For example, when the scanned part is the brain, due to the fine brain structure, a small motion artifact will also affect the brain scanning results. However, because the abdomen itself inevitably has respiratory artifacts, when there are respiratory artifacts in the abdominal scanning image, the influence on the abdominal scanning image is also weak. Therefore, when determining the target artifact extent determination model, it may be necessary to consider the influence of different scanning positions and imaging planes on the target artifact extent determination model. For example, when scanning the brain, the corresponding target artifact extent determination model is more refined.

Based on the above contents, the processing device 140 may determine the target artifact extent determination model based on any one of the field strength information, target artifact feature information, scanned position and scanning orientation. The target artifact extent determination model may also be determined based on any two of the field strength information, target artifact feature information, scanned position and scanning orientation. The target artifact extent determination model may also be determined by comprehensively considering the influencing factors of imaging device 110 field strength information, target artifact feature information, scanned position and scanning orientation.

In some embodiments of the present disclosure, the processing device 140 may determine the target artifact extent determination model based on at least one of the field strength information, target artifact feature information, scanned position and scanning orientation. Thus, the target artifact extent determination model may adapt to the field strength information of imaging device 110, target artifact feature information, scanned position and scanning orientation, to ensure that the artifact extent indication information output by the target artifact extent determination model is more accurate, to improve the accuracy of medical image processing.

In some embodiments of the present disclosure, the medical image may not contain label information. In the above operations 401 and 501, "the processing device 140 obtains the field strength information of the imaging device 110 corresponding to the medical image" may include the following contents:

The processing device 140 may input the medical image into the field strength recognition model to obtain the field strength information of the imaging device 110.

Specifically, after acquiring the medical image, the processing device 140 may input the medical image into the field strength recognition model in order to determine the field strength information of the imaging device 110 corresponding to the medical image.

For example, the field strength recognition model may extract the features of the medical image, and identify the definition of the medical image based on the extracted features, to determine the field strength information of the imaging device 110 corresponding to the medical image.

The field strength identification model may be machine learning network model or other network models. The machine learning network model may be deep neural networks (DNN), convolutional neural networks (CNN) or recurrent neural network (RNN), etc. When the field strength recognition model is CNN, it may be V-Net model, U-Net model, generative adversarial networks model, etc. The embodiment of the present disclosure may not specifically limit the type of target artifact identification model.

For example, when the imaging information identification model is CNN, the structure of the imaging information identification model may be similar to the structure 600 in connection with the description in FIG. 6.

In some embodiments of the present disclosure, the processing device 140 inputs the medical image to the field strength recognition model to obtain the field strength information of the imaging device 110. It may ensure the accuracy of the field strength information of imaging device 110.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 10:
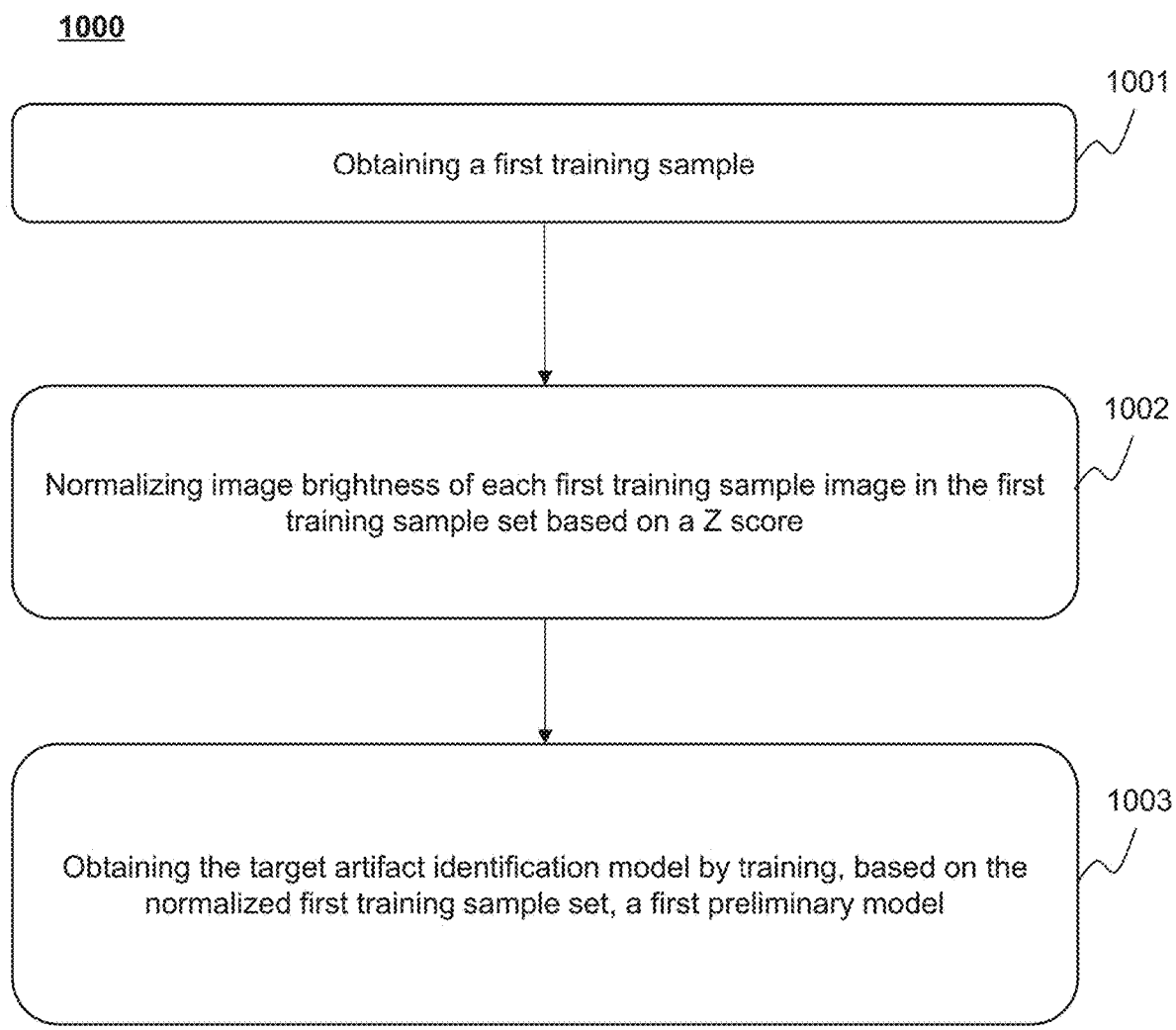
FIG. 10 is a flowchart illustrating an exemplary training process for obtaining a target artifact identification model according to some embodiments of the present disclosure.

In some embodiments of the present disclosure, as shown in FIG. 10, the training process 1000 of the above target artifact identification model may include the following operations. In some embodiments, the process 1000 may be performed by a computer device (e.g., the processing device 400-2) implemented on the imaging system 100 (e.g., the processing device 140), or an external device.

In 1001, the computer device may obtain a first training sample set.

Specifically, the computer device may obtain a first training sample set. The first training sample set includes a plurality of first training samples, and each first training sample includes a first training sample image and training artifact feature information corresponding to the first training sample image.

It should be noted that the types of artifacts corresponding to different scanned parts are different, for the artifact identification models of different scanned parts, the corresponding training sample sets are different. For example, the training sample set corresponding to the chest artifact identification model includes a variety of chest scanning images.

For example, the computer device may obtain the first training sample set from a server of picture archiving and communication systems (PACS) or obtain the first training sample set in real time from the medical imaging device.

For another example, in order to facilitate the identification of each first training sample image in the first training sample set, after the computer device obtaining the first training sample set, each first training sample image may be split on the X-axis, Y-axis and Z-axis respectively based on each axis to obtain the sample two-dimensional sectional view of each perspective of each first training sample image. The X-axis, the Y-axis and the Z-axis may correspond to coronal, sagittal and transverse positions, respectively. The computer device may train the coronal position, sagittal position or transverse position separately corresponding to the first training sample image in the first training sample set.

In 1002, the computer device may normalize the image brightness of each first training sample image in the first training sample set based on a Z score (also referred to as a standard score).

Specifically, in order to ensure the accuracy of the target artifact identification model obtained by training, and avoid the computer device recognizing the scanned part in the first training sample image as artifact or processing the medical image in the first training sample image as the scanned part, the computer device may normalize the image brightness of each first training sample image in the first training sample set based on the Z score.

Z score, also known as standard score, is a process of dividing, by the standard deviation, the difference between a value and the average. In statistics, standard score is a symbol of the standard deviation of the value of an observation or data point higher than the average of the observed value or measured value.

Specifically, the computer device may calculate the image brightness of each first training sample image respectively, and calculate the average value and standard deviation of the image brightness of the first training sample set according to the image brightness of each first training sample image. The computer device may obtain the image brightness of each first training sample image after normalization by dividing the difference between the image brightness of each first training sample image and the average value of the image brightness of the first training sample set by the standard deviation of the image brightness of the first training sample set.

After the computer device normalizing the image brightness of each first training sample image in the first training sample set based on the Z score, it may ensure that the gap between the image brightness of each first training sample image is small. Using the normalized first training sample image to train the target artifact identification model is conducive to ensuring the accuracy of the target artifact identification model.

In 1003, the computer device may obtain the target artifact identification model by training, based on the normalized first training sample set, a first preliminary model.

Specifically, after obtaining the normalized first training sample set, the computer device may input the normalized first training sample set into the untrained first preliminary model to obtain the target artifact identification model.

For example, the artifact identification model may recognize the first training sample image in each first training sample. Each pixel in the first training sample image may be identified to determine the scanned part included in the first training sample image. After determining the scanned part included in the first training sample image, other pixels in the first training sample image may be identified except the scanned part to identify the artifact and determine the position of the artifact. Then, according to the distribution of artifacts and the pixel value corresponding to artifacts, feature information such as depth, size and type of artifacts may be determined. Finally, the feature information of the artifact may be output.

Further, during the training of the above target artifact identification model, an Adam optimizer may be selected to optimize the target artifact identification model, so that the target artifact identification model may converge quickly and have good generalization ability.

When using the Adam optimizer to optimize the target artifact identification model, a learning rate may be set for the optimizer. The learning rate range test (LR range test) may be used to select the best learning rate and the best learning rate may be set to the optimizer. The learning rate selection process of the test technology is: first set the learning rate to a small value, then simply iterate the candidate artifact recognition network and the first training medical image data for several times, increase the learning rate after each iteration, and record the training loss each time, and then draw the LR range test graph. Generally, an ideal LR range test graph may include three regions: the learning rate of the first region is too small, the loss is basically unchanged; the loss of the second region decreases and converges quickly; and the learning rate of the last region is too large so that the loss begins to diverge. Then, the learning rate corresponding to the lowest point in the LR range test graph may be taken as the best learning rate, and the best learning rate is set to the optimizer as the initial learning rate of the Adam optimizer.

In some embodiments of the present disclosure, the computer device obtains the first training sample set and normalizes the image brightness of each first training sample image in the first training sample set based on the Z score. The computer device trains the artifact recognition network based on the normalized first training sample set to obtain the target artifact identification model. In the embodiment of the present disclosure, the target artifact identification model is trained through the first training sample set. Therefore, the obtained target artifact identification model is more accurate. Thus, the feature information of the artifact identified by the target artifact identification model is more accurate.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 1002 for performing normalization using the Z score may be omitted.

Figure 11:
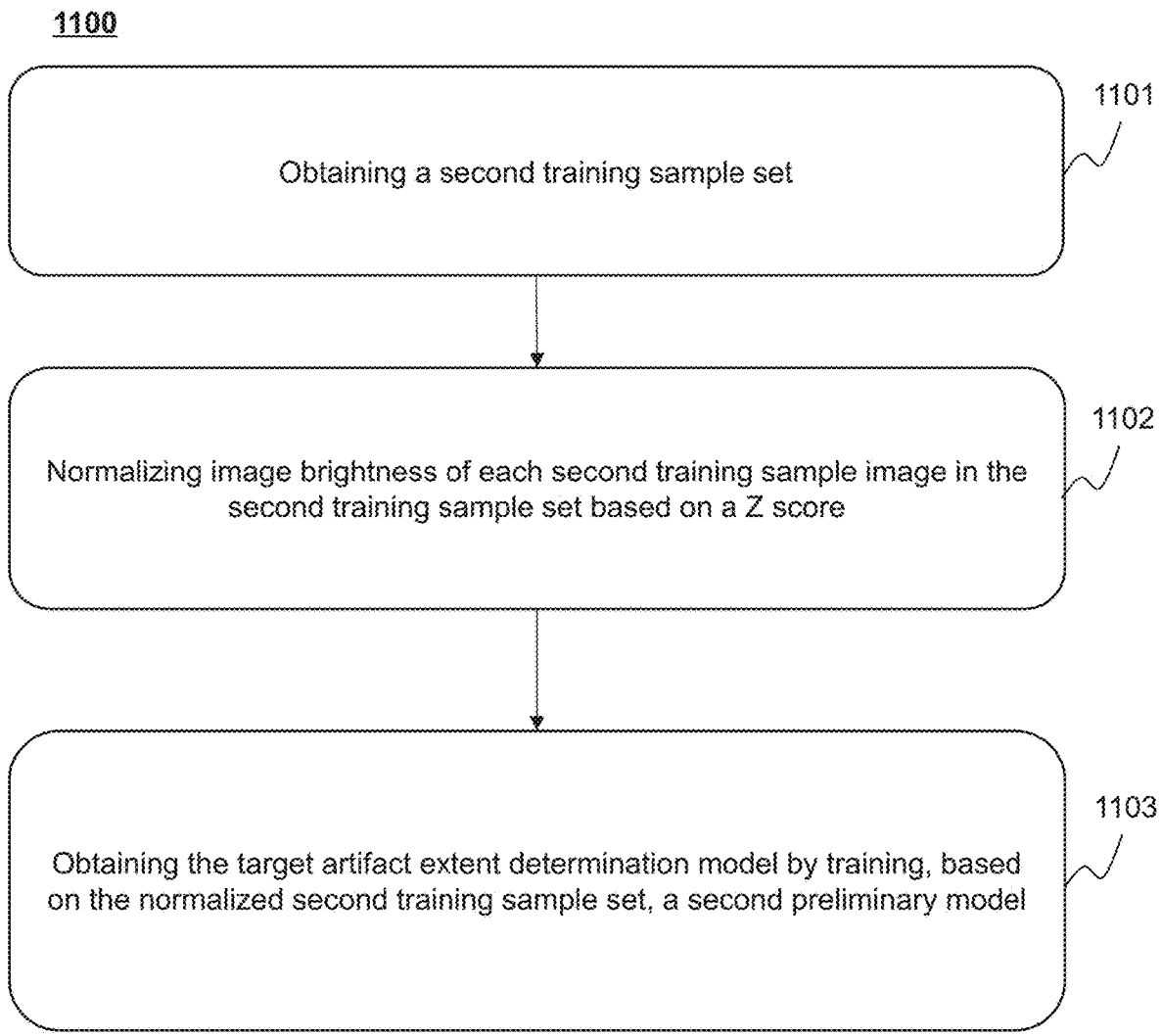
FIG. 11 is a flowchart illustrating an exemplary training process for obtaining a target artifact indication determination model according to some embodiments of the present disclosure.

In some embodiments of the present disclosure, as shown in FIG. 11, the training process 1100 of the above target artifact extent determination model may include the following operations. In some embodiments, the process 1100 may be performed by a computer device (e.g., the processing device 400-2) implemented on the imaging system 100 (e.g., the processing device 140), or an external device.

In 1101, the computer device may obtain a second training sample set.

Specifically, the computer device obtain a second training sample set. The second training sample set includes a plurality of second training samples, and each second training sample includes a second training sample image and training artifact extent indication information corresponding to the second training sample image.

For example, the computer device may obtain the second training sample image from a server of picture archiving and communication systems (PACS), or the training artifact extent indication information corresponding to the second training sample image may be labelled through the expert group or machine learning algorithm to obtain the second training sample set. The second training sample image may also be obtained in real time from the medical imaging device, or the second training sample set may be obtained by labelling the artifact extent indication information corresponding to the second training sample image through the expert group or machine learning algorithm.

In 1102, the computer device may normalize image brightness of each second training sample image in the second training sample set based on a Z score.

Specifically, in order to ensure the accuracy of the target artifact extent determination model obtained by training and avoid the computer device misjudging the influence degree of artifact in the second training sample image on the second training sample image because the brightness of each second training sample image is different, therefore, the computer device may normalize the image brightness of each second training sample image in the second training sample set based on the Z score.

Z score, also known as standard score, is a process of dividing the difference between the number and the average by the standard deviation. In statistics, standard score is a symbol of the standard deviation of the value of an observation or data point higher than the average of the observed value or measured value.

Specifically, the computer device may calculate the image brightness of each second training sample image respectively, and calculate the average value and standard deviation of the image brightness of the second training sample set according to the image brightness of each second training sample image. The computer device may obtain the image brightness of each second training sample image after normalization by dividing the difference between the image brightness of each second training sample image and the average value of the image brightness of the second training sample set by the standard deviation of the image brightness of the second training sample set.

After the computer device normalizing the image brightness of each first training sample image in the first training sample set based on the Z score, it may ensure that the gap between the image brightness of each second training sample image is small. Using the normalized first training sample image to train the target artifact identification model is conducive to ensuring the accuracy of the target artifact identification model.

In 1103, the computer device may obtain the target artifact extent determination model by training, based on the normalized second training sample set, a second preliminary model.

Specifically, after obtaining the normalized second training sample set, the computer device may input the normalized second training sample set into the untrained second preliminary model to obtain the target artifact extent determination model.

For example, the artifact extent determination model may recognize the feature information of the artifact, then judge the influence degree of the artifact in the second training image on the second training sample image according to the feature information of the artifact and the image information of the scanned part in the second training sample image, and output the artifact extent indication information corresponding to the second sample image.

The computer device may class the artifact influence degree of the artifact extent indication information according to the influence degree of the artifact on the second training sample image. The loss function of the artifact extent determination model may be the cross entropy loss function, and may be represented as Equation (2) below:

$$H(p, q) = -\sum_{i=1}^{n} p(x_i)\log(q(x_i)) \qquad (2)$$

where $x_i$ is an artifact influence degree category, i=1, 2, 3, 4; p(x) is a true probability distribution; and q(x) is a prediction probability distribution.

Further, during the training of the above target artifact extent determination model, Adam optimizer may be selected to optimize the target artifact extent determination model, so that the target artifact extent determination model may converge quickly and have good generalization ability.

In some embodiments of the present disclosure, the computer device obtains the second training sample set and normalizes the image brightness of each second training sample image in the second training sample set based on the Z score. The computer device trains the artifact degree recognition network based on the normalized second training sample set to obtain the target artifact extent determination model. In some embodiments of the present disclosure, the target artifact extent determination model is trained by the second training sample image and the artifact extent indication information corresponding to the second training sample image, so the accuracy of the obtained target artifact extent determination model is guaranteed. Thus, the target artifact extent indication information obtained by using the target artifact extent determination model is more accurate.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 1102 for performing normalization using the Z score may be omitted.

Figure 12:
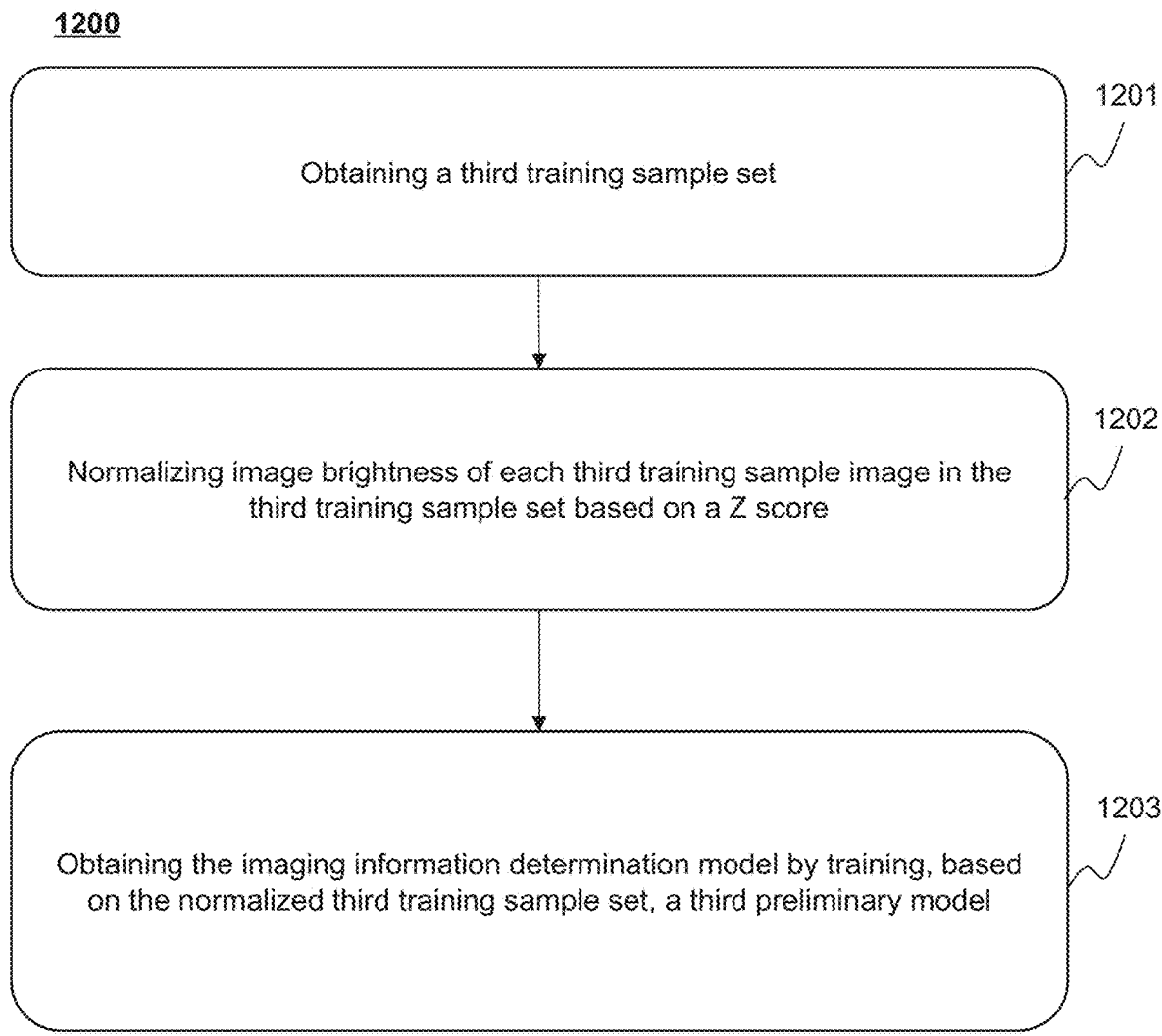
FIG. 12 is a flowchart illustrating an exemplary training process for obtaining an imaging information determination model according to some embodiments of the present disclosure.

In some embodiments of the present disclosure, as shown in FIG. 12, the training process 1200 of the above imaging information determination model may include the following operations. In some embodiments, the process 1200 may be performed by a computer device (e.g., the processing device 400-2) implemented on the imaging system 100 (e.g., the processing device 140), or an external device.

In 1201, the computer device may obtain a third training sample set.

Specifically, the computer device may obtain a third training sample set. The third training sample set includes a plurality of third training samples, and each third training sample includes a third training sample image, an imaging region and an imaging plane corresponding to the third training sample image.

For example, the computer device may obtain the third training sample set from the server of PACS server, or obtain the third training sample set in real time from the medical imaging device.

In 1202, the computer device may normalize the image brightness of each third training sample image in the third training sample set based on a Z score.

Specifically, in order to ensure the accuracy of the trained imaging information determination model and avoid the definition recognition error of each third training sample image by the computer device due to the different brightness of each third training sample image, resulting in the recognition error of the scanned part and scanning direction corresponding to each third training sample image. Therefore, the computer device may normalize the image brightness of each third training sample image in the third training sample set based on the Z score.

Specifically, the computer device may calculate the image brightness of each third training sample image respectively, and calculate the average value and standard deviation of the image brightness of the third training sample set according to the image brightness of each third training sample image. The computer device may obtain the image brightness of each third training sample image after the normalization process by dividing the difference between the image brightness of each third training sample image and the average value of the image brightness of the third training sample set by the standard deviation of the image brightness of the third training sample set.

Based on the Z-score, the computer device may ensure that the difference between the image brightness of each third training sample image in the third training sample set is small after the normalization processing of the image brightness of each third training sample image. Using the third training sample image after the normalization processing to train the imaging information determination model is conducive to ensuring the accuracy of the imaging information determination model.

In 1203, the computer device may obtain the imaging information determination model by training, based on the normalized third training sample set, a third preliminary model.

Specifically, after obtaining the normalized third training sample set, the computer device may input the normalized third training sample set to the third preliminary model to obtain the target imaging information determination model.

For example, the imaging information determination model may extract the feature information of each third training sample image, and determine the imaging plane of the imaging region in each third training sample image according to the collected feature information.

Further, during the training of the above imaging information determination model, Adam optimizer may be selected to optimize the imaging information determination model, so that the imaging information determination model may converge quickly and have good generalization ability.

When using the Adam optimizer to optimize the imaging information determination model, a learning rate may be set for the optimizer. The learning rate range test (LR range test) may be used to select the best learning rate and the best learning rate may be set to the optimizer. The learning rate selection process of the test technology is: first set the learning rate to a small value, then simply iterate the candidate artifact recognition network and the first training medical image data for several times, increase the learning rate after each iteration, and record the training loss each time, and then draw the LR range test graph. Generally, an ideal LR range test graph may include three regions: the learning rate of the first region is too small, the loss is basically unchanged; the loss of the second region decreases and converges quickly; and the learning rate of the last region is too large so that the loss begins to diverge. Then, the learning rate corresponding to the lowest point in the LR range test graph may be taken as the best learning rate, and the best learning rate may be set to the optimizer as the initial learning rate of the Adam optimizer.

In some embodiments of the present disclosure, the computer device obtains the third training sample set and normalizes the image brightness of each third training sample image in the third training sample set based on the Z score. The computer device trains the untrained location recognition network based on the normalized third training sample set to obtain the imaging information determination model. In some embodiments of the present disclosure, the imaging information determination model is trained by the third training sample set after normalization processing to ensure the accuracy of the obtained imaging information determination model. Therefore, when the imaging information determination model is accurate, the accuracy of the artifact feature information identified by the target artifact identification model may be guaranteed.

It should be noted that the first training sample set, the second training sample set, and the third training sample set in the above embodiments may be generated after different annotations of the same medical image, or different medical images may be generated after different annotations. The embodiments of the disclosure may not specifically limit the first training sample set, the second training sample set or the third training sample set.

In order to better explain the medical image processing method provided by the present disclosure, the present disclosure provides an embodiment for explaining the overall flow of the medical image processing method. The method may include following operations.

The computer device may obtain the first training sample set.

The computer device may normalize the image brightness of each first training sample image in the first training sample set based on the Z score.

The computer device may obtain the target artifact identification model by training, based on the normalized first training sample set, a first preliminary model.

The computer device may obtain a second training sample set.

The computer device may normalize the image brightness of each second training sample image in the second training sample set based on the Z score.

The computer device may obtain the target artifact extent determination model by training, based on the normalized second training sample set, a second preliminary model.

The computer device may obtain a third training sample set.

The computer device may normalize the image brightness of each third training sample image in the third training sample set based on the Z score.

The computer device may obtain the imaging information determination model by training, based on the normalized third training sample set, a third preliminary model.

The processing device 140 may read the label information of the medical image to obtain the field strength information corresponding to the medical image.

The processing device 140 may obtain the imaging information determination model corresponding to the field strength information of the medical device.

The processing device 140 may input the medical image to the imaging information determination model to obtain the imaging region and the imaging plane included in the medical image.

The processing device 140 may determine the target artifact identification model according to the field strength information of the medical device, the imaging region and the imaging plane.

The processing device 140 may input the medical image to the target artifact identification model to obtain the target artifact feature information output by the target artifact identification model.

The target artifact extent determination model may be determined according to at least one of the field strength information, the target artifact feature information, the imaging region, and the imaging plane.

The processing device 140 may input the medical image and the target artifact feature information to the target artifact extent determination model to obtain the artifact extent indication information output by the target artifact extent determination model.

When the influence degree of the artifacts in the medical image on the image quality of the medical image is greater than the predetermined artifact influence extent threshold, the processing device 140 may output the prompt information.

In order to better explain the medical image processing method provided by the present disclosure, the present disclosure provides an embodiment for explaining the overall flow of another medical image processing method. The method may include following operations.

The computer device may obtain the first training sample set.

The computer device may normalize the image brightness of each first training sample image in the first training sample set based on the Z score.

The computer device may obtain the target artifact identification model by training, based on the normalized first training sample set, a first preliminary model.

The computer device may obtain a second training sample set.

The computer device may normalize the image brightness of each second training sample image in the second training sample set based on the Z score.

The computer device may obtain the target artifact extent determination model by training, based on the normalized second training sample set, a second preliminary model.

The computer device may obtain a third training sample set.

The computer device may normalize the image brightness of each third training sample image in the third training sample set based on the Z score.

The computer device may obtain the imaging information determination model by training, based on the normalized third training sample set, a third preliminary model.

The processing device 140 may read the label information of the medical image to obtain the field strength information of the medical device corresponding to the medical image.

The processing device 140 may obtain the target artifact identification model corresponding to the field strength information of the medical device.

The processing device 140 may input the medical image to the target artifact identification model to obtain the target artifact feature information output by the target artifact identification model.

The processing device 140 may determine the imaging information determination model according to the medical device field strength information and the target artifact feature information.

The processing device 140 may input the medical image to the imaging information determination model to obtain the scanned part and scanning direction included in the medical image.

The target artifact extent determination model may be determined according to at least one of the medical device field strength information, the target artifact feature information, the scanned part or the scanning orientation.

The processing device 140 may input the medical image and the target artifact feature information to the target artifact extent determination model to obtain the artifact extent indication information output by the target artifact extent determination model.

When the influence degree of the artifact in the medical image on the image quality of the medical image is greater than the predetermined artifact influence degree threshold, the processing device 140 may output the prompt information.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 1202 for performing normalization using the Z score may be omitted.

In some embodiments, the target artifact identification model and/or the target artifact extent determination model may be a semi supervised learning model in machine learning. Of course, the target artifact identification model and/or the target artifact extent determination model may also be other network models. The semi supervised learning model may be a self-training model, a generated probability model, a semi-supervised support vector machine (SVM), a graph-based method, multiview learning model, etc. The embodiments of the present disclosure may not specifically limit the type of target artifact identification model and the target artifact extent determination model.

In some embodiments of the present disclosure, as shown in FIG. 13, a training process 1300 of the target artifact identification model may include following operations. For purpose of illustration, the process 1300 is illustrated as being performed by the processing device 140. It should be noted that the process 1300 may also be performed by other devices, e.g., an external device other than the imaging system 100.

In some embodiments, the target artifact identification model may be obtained based on a fourth training sample set. The fourth training sample set may include labeled fourth training sample images and unlabeled fifth training sample images. For example, each of the fourth training sample images may be with a first label, and the fifth training sample images may be without the first label or without any label. The first label may include artifact feature information of a training sample image, also referred to as training artifact feature information.

In some embodiments, the fourth training sample set may include images with a variety of image types, imaging regions, imaging planes, artifact types, artifact sizes, artifact locations, etc.

In 1301, the processing device 140 may obtain a candidate artifact identification model by training, based on fourth training sample images, a fourth preliminary model.

In some embodiments, the processing device 140 may obtain the medical image from a server of picture archiving and communication systems (PACS), and may also obtain the medical image from medical imaging devices in real time. After obtaining the medical image, professionals may observe the medical images and label the artifact feature information in the medical images to generate the fourth training medical image corresponding to the first label.

It should be noted that the types of artifacts corresponding to different scanned parts are different. For the artifact identification models of different scanned parts, the corresponding training medical images are different. For example, the fourth training medical image corresponding to a chest artifact identification model may include a variety of chest scanning images.

For example, in order to facilitate the recognition of the fourth training medical image, after obtaining the fourth training medical image, each fourth training medical image may be split on the X-axis, Y-axis and Z-axis respectively based on each axis to obtain the sample two-dimensional sectional view of each perspective of the fourth training medical image. The X-axis, the Y-axis and the Z-axis may correspond to coronal, sagittal and transverse positions, respectively. The processing device 140 may train the coronal position, sagittal position or transverse position separately corresponding to each fourth training medical image.

In order to ensure the accuracy of the trained target artifact identification model and avoid the processing device 140 recognizing the scanned part in the fourth training medical image as artifact or processing the medical image in the fourth training medical image as the scanned part, the processing device 140 may normalize the brightness of each fourth training medical image based on the Z score.

After obtaining the normalized fourth training medical image, the processing device 140 may input the normalized fourth training medical image to the initial artifact identification network to train the initial artifact identification network. Thus, the candidate artifact identification network may be obtained.

For another example, the initial artifact identification network may recognize each fourth training medical image. First, each pixel in the fourth training medical image is recognized to determine the scanned part included in the fourth training medical image. After determining the scanned part included in the fourth training medical image, other pixels may be identified in the fourth training medical image except the scanned part. Thus, the artifact may be identified and the position of the artifact may be determined. Then, based on the distribution of artifacts and the pixel value corresponding to artifacts, feature information such as depth, size and type of artifacts are determined. Finally, the feature information of the artifact may be output.

Further, when the candidate artifact identification network is trained, an Adam optimizer may be selected to optimize the candidate artifact identification network, so that the candidate artifact identification network may converge quickly and have good generalization ability.

When the candidate artifact identification network is optimized by the Adam optimizer, a learning rate may also be set for the optimizer, the learning rate range test (LR range test) may be used to select the best learning rate and the best learning rate may be set to the optimizer. The learning rate selection process of the test technology is: first set the learning rate to a small value, then simply iterate the candidate artifact identification network and the fourth training medical image data for several times, increase the learning rate after each iteration, and record the training loss each time, and then draw the LR range test graph. Generally, an ideal LR range test graph may include three regions: the learning rate of the first region is too small, the loss is basically unchanged; the loss of the second region decreases and converges quickly; and the learning rate of the last region is too large so that the loss begins to diverge. Then, the learning rate corresponding to the lowest point in the LR range test graph may be taken as the best learning rate, and the best learning rate may be set to the optimizer as the initial learning rate of the Adam optimizer.

In 1302, the processing device 140 may obtain an intermediate artifact feature information by inputting fifth training sample images into the candidate artifact identification model, and designate the intermediate artifact feature information as a first pseudo label of the fifth training sample images.

In some embodiments, after training the initial artifact identification network (e.g., the fourth preliminary model) based on the fourth training medical image to obtain the candidate artifact identification network, the processing device 140 may input the fifth training medical image to the candidate artifact identification network to obtain the intermediate artifact feature information output by the candidate artifact identification network. The intermediate artifact feature information may be used as the first pseudo label corresponding to the fifth training medical image.

The processing device 140 may obtain the fifth training medical image from the server of PACS, or obtain the fifth training medical image in real time from the medical imaging device.

It should be noted that the types of artifacts corresponding to different scanned parts are different. For the artifact identification models of different scanned parts, the corresponding fifth training medical images are different. For example, the fifth training medical image corresponding to the chest artifact identification model includes only a variety of chest scanning images.

In some embodiments, the processing device 140 may recognize the features in the fifth training medical image using the feature extraction layer in the candidate artifact identification network, recognize the artifact from the fifth training medical image, and determine the location of the artifact. Then, based on the distribution of artifacts and the pixel value corresponding to artifacts, feature information such as depth, size and type of artifacts may be determined. Finally, the training artifact feature information is output. For another example, the processing device 140 may select the training artifact feature information with the highest confidence from the training artifact feature information output by the candidate artifact identification network as the first pseudo label corresponding to the fifth training medical image.

In 1303, the processing device 140 may obtain the target artifact identification model by training, based on the fourth training sample images with a first label and the fifth training sample images with the first pseudo label, the candidate artifact identification model.

In some embodiments, the processing device 140 may input the fourth training medical images and the fifth training medical images with the first pseudo label to the candidate artifact identification network respectively, calculate the loss values corresponding to the fourth training medical images and the fifth training medical images with the first pseudo label respectively by using a loss function (e.g., a cross entropy loss function). Based on the calculated loss value, the candidate artifact identification network may be trained, and finally the target artifact identification model may be obtained.

In some embodiments of the present disclosure, the processing device 140 trains the initial artifact identification network (e.g., the fourth preliminary model) based on the fourth training medical images to obtain a candidate artifact identification network. The fifth training medical images are input to the candidate artifact identification network, the intermediate artifact feature information output by the candidate artifact identification network is obtained, and the intermediate artifact feature information is used as the first pseudo label corresponding to the fifth training medical images. The candidate artifact identification network is trained by using the fourth training medical images and the fifth training medical images with the first pseudo label to obtain the target artifact identification model. It may not only ensure the accuracy of the trained target artifact identification model, but also reduce the dependence on label samples and reduce the workload of labeling samples. Thus, the inaccurate target artifact identification model caused by different sample labeling rules may be avoid.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments of the present disclosure, as shown in FIG. 15, operation 1303 may be performed based on the following operations.

In 1501, the processing device 140 may obtain a first output artifact feature information by inputting the fourth training sample images into the candidate artifact identification model, and determining a first loss value based on the first output artifact feature information and the first label.

In some embodiments, the processing device 140 may input the fourth training medical images to the candidate artifact identification network, output the first output artifact feature information corresponding to the fourth training medical images, and calculate the first loss value between the first output artifact feature information output by the candidate artifact identification network and the first label corresponding to the fourth training medical images by using the cross entropy loss function.

In 1502, the processing device 140 may obtain a second output artifact feature information by inputting the fifth training sample images into the candidate artifact identification model, and determining a second loss value based on the second output artifact feature information and the first pseudo label.

In some embodiments, the processing device 140 inputs the fifth training medical images to the candidate artifact identification network, outputs the second output artifact feature information corresponding to the fifth training medical images, and uses the cross entropy loss function to calculate the second loss value between the second output artifact feature information output by the candidate artifact identification network and the first pseudo label corresponding to the fifth training medical images.

In 1503, the processing device 140 may obtain a first weight corresponding to the first loss value and a second weight corresponding to the second loss value, and determine a first target loss value by determining, based on the first weight and the second weight, a weighted sum of the first loss value and the second loss value.

The first weight value and the second weight value may be determined based on the number of iterations currently updating the network parameters in the candidate artifact identification network.

Specifically, the processing device 140 may determine the first weight value and the second weight value corresponding to the first loss value and the second loss value respectively based on the number of candidate artifact identification network iterations. In order to avoid model training failure due to the inaccurate first pseudo label, when the number of iterations is small, the value of the second weight may be set smaller, thus the influence of the second loss value on the first target loss value may be reduced. For example, assuming the current candidate artifact identification network only iterates 10 times, thus, the first weight corresponding to the first loss value may be 1 and the second weight corresponding to the second loss value may be 0. For another example, as the number of iterations increases, the value corresponding to the first weight may become smaller and smaller, and the value corresponding to the second weight may become larger and larger until the predetermined number of iterations is reached. Assuming that the predetermined number of iterations is 1000, thus, the proportion of the first loss value and the second loss value is the same, that is, the first weight value and the second weight value are the same.

After determining the first weight value and the second weight value corresponding to the first loss value and the second loss value respectively, the processing device 140 may determine a weighted sum of the first loss value and the second loss value based on the first weight value and the second weight value to obtain the first target loss value.

The processing device 140 updates the network parameters in the candidate artifact identification network based on the first target loss value. Until the update reaches a terminal condition, the value of the first target loss value does not change. The processing device 140 determines to train to obtain the target artifact identification model.

An exemplary termination condition may be that the value of the loss function in the current iteration is less than a threshold value (e.g., the minimum cost function). Other exemplary termination conditions may include that a maximum number (or count) of iterations has been performed, that the approximation error is less than a certain threshold, a difference between the values of the loss function obtained in a previous iteration and the current iteration (or among the values of the loss function within a certain number or count of successive iterations) is less than a certain threshold, that a difference between the approximation error at the previous iteration and the current iteration (or among the approximation errors within a certain number or count of successive iterations) is less than a certain threshold.

In some embodiments, during the training of the above target artifact identification model, Adam optimizer may be selected to optimize the target artifact identification model, so that the target artifact identification model may converge quickly and have good generalization ability.

When using the Adam optimizer to optimize the target artifact identification model, a learning rate may also be set for the optimizer. The learning rate range test (LR range test) may be used to select the best learning rate and set it to the optimizer. A process for learning rate selection of the LR range test may be: setting the learning rate to a small value, then simply iterating the target artifact identification model, the fourth training medical image and the fifth training medical image data for several times, increasing the learning rate after each iteration, and recording loss (loss) in each process of training, and then drawing the LR range test graph. Generally, the ideal LR range test graph may include three regions: the learning rate of the first region is too small, the loss is basically unchanged, the loss of the second region decreases and converges quickly, and the learning rate of the last region is too large so that the loss begins to diverge. Then, the learning rate corresponding to the lowest point in the LR range test graph may be taken as the best learning rate. The best learning rate may be set to the optimizer as the initial learning rate of the Adam optimizer.

In the embodiment of the present disclosure, the fourth training medical images may be input to the candidate artifact identification network, and the first loss value may be obtained based on the output of the candidate artifact identification network and the first label on the fourth training medical images. The fifth training medical images may be input to the candidate artifact identification network, and the second loss value is obtained based on the output of the candidate artifact identification network and the first pseudo label on the fifth training medical images. The first weight value and the second weight value corresponding to the first loss value and the second loss value are obtained respectively, and the first loss value and the second loss value are weighted and summed based on the obtained first weight value and the second weight value to obtain the first target loss value, and the network parameters in the candidate artifact identification network are updated based on the first target loss value. In the above method, the first weight value and the second weight value are determined based on the number of iterations to update the network parameters in the candidate artifact identification network, which may ensure that the first loss value and the second loss value play an appropriate role in the model training process, and may avoid the failure of model training due to the inaccurate first pseudo label, the accuracy of the model may be ensured.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments of the present disclosure, as shown in FIG. 16, the training process 1600 of the above target artifact extent determination model may include the following operations. For purpose of illustration, the process 1600 is illustrated as being performed by the processing device 140. It should be noted that the process 1600 may also be performed by other devices, e.g., an external device other than the imaging system 100.

In some embodiments, the target artifact extent determination model may be obtained based on a fifth training sample set. The fifth training sample set may include labeled sixth training sample images and unlabeled seventh training sample images. For example, each of the sixth training sample images may be with a second label, and the seventh training sample images may be without the second label or without any label. The second label may include training artifact extent indication information of a medical image.

In some embodiments, the fifth training sample set may include images with a variety of image types, imaging regions, imaging planes, artifact types, artifact sizes, artifact locations, artifact extent indication information, etc.

In 1601, the processing device 140 may obtain a first output artifact feature information by inputting the fourth training sample images into the candidate artifact identification model, and determining a first loss value based on the first output artifact feature information and the first label.

For example, the processing device 140 may obtain medical images from the sever of PACS, and may also obtain medical images in real time from medical imaging device. After obtaining medical images, professionals may observe the medical images and label the artifact extent indication information in the medical images, thus the sixth training medical image labelling the second label may be generated.

It should be noted that due to the different types of artifacts corresponding to different scanned parts, the influence degree of artifacts on medical images is also different. Therefore, for the artifact extent determination models of different scanned parts, the corresponding sixth training medical images are different. For example, the sixth training medical image corresponding to the chest artifact extent determination model includes only a variety of chest scanning images.

For another example, in order to facilitate the recognition of the sixth training medical image, after obtaining the sixth training medical image, each sixth training medical image may be split on the X-axis, Y-axis and Z-axis respectively based on each axis to obtain the sample two-dimensional sectional view of each perspective of the sixth training medical image. The X-axis, the Y-axis and the Z-axis may correspond to coronal, sagittal and transverse positions, respectively. The processing device 140 may train the coronal position, sagittal position or transverse position separately corresponding to each seventh training medical image.

In order to ensure the accuracy of the trained target artifact identification model and avoid the processing device 140 recognizing the scanned part in the sixth training medical image as artifact or processing the medical image in the sixth training medical image as the scanned part, the processing device 140 may normalize the brightness of each sixth training medical image based on the Z score.

After obtaining the normalized sixth training medical image, the processing device 140 may input the normalized sixth training medical image to the initial artifact identification network to train the initial artifact identification network. Thus, the candidate artifact extent determination model may be obtained.

For example, the initial artifact extent determination model may recognize each sixth training medical image. First, each pixel in the sixth training medical image is recognized to determine the scanned part included in the sixth training medical image. After determining the scanned part included in the sixth training medical image, other pixels in the sixth training medical image may be identified except the scanned part, thus the artifact may be identified and the position of the artifact may be determined. Then, the feature information such as the depth, size and type of the artifact may be determined based on the distribution of the artifact and the pixel value corresponding to the artifact, and the influence degree of the artifact in the sixth training medical image on the sixth training medical image may be judged based on the artifact feature information and the image information of the scanned part in the sixth training medical image, finally the artifact extent indication information corresponding to the sixth training medical image may be output.

The processing device 140 may class the artifact influence degree by the artifact extent indication information based on the influence degree of the artifact on the sixth training medical image. The loss function of the artifact extent determination model may be the cross entropy loss function represented as Equation (3):

$$H(p, q) = -\sum_{i=1}^{n} p(x_i)\log(q(x_i)) \tag{3}$$

where $x_i$ is an artifact influence degree category, i=1, 2, 3, 4; p(x) is a true probability distribution; and q(x) is a prediction probability distribution.

Further, when the candidate artifact extent determination model is trained, Adam optimizer may be selected to optimize the candidate artifact extent determination model, so that the candidate artifact extent determination model may converge quickly and have good generalization ability.

When the Adam optimizer is used to optimize the candidate artifact degree identification network, a learning rate may also be set for the optimizer. The learning rate range test (LR range test) may be used to select the best learning rate and the best learning rate may be set to the optimizer. The learning rate selection process of the test technology is: first set the learning rate to a small value, then simply iterate the candidate artifact identification network and the seventh training medical image data for several times, increase the learning rate after each iteration, and record the training loss each time, and then draw the LR range test graph. Generally, an ideal LR range test graph may include three regions: the learning rate of the first region is too small, the loss is basically unchanged; the loss of the second region decreases and converges quickly; and the learning rate of the last region is too large so that the loss begins to diverge. Then, the learning rate corresponding to the lowest point in the LR range test graph may be taken as the best learning rate, and the best learning rate may be set to the optimizer as the initial learning rate of the Adam optimizer.

In 1602, the processing device 140 may obtain an intermediate artifact extent indication information by inputting seventh training sample images into the candidate artifact extent determination model, and designating the intermediate artifact extent indication information as a second pseudo label of the seventh training sample images.

Specifically, after the initial artifact extent determination model (e.g., the fifth preliminary model) is trained based on the sixth training medical images to obtain the candidate artifact extent determination model, the processing device 140 may input the seventh training medical images to the candidate artifact extent determination model to obtain the intermediate artifact extent indication information output by the candidate artifact extent determination model. The intermediate artifact extent indication information is used as the second pseudo label corresponding to the second training sample.

The processing device 140 may obtain the seventh training medical image from the server of the PACS, or obtain the seventh training medical image in real time from the medical imaging device.

It should be noted that due to the different types of artifacts corresponding to different scanned parts, the influence degree of artifacts on medical images is also different, for the artifact extent determination models of different scanned parts, the corresponding seventh training medical images are different. For example, the seventh training medical image corresponding to the chest artifact extent determination model includes a variety of chest scanning images.

Specifically, the processing device 140 may recognize the features in the seventh training medical image by using the feature extraction layer in the candidate artifact extent determination model, and determine the influence degree of the artifact on the seventh training medical image based on the scanned part in the seventh training medical image and the feature information such as the depth, size and type of the artifact. Thus, the training artifact extent indication information may be output, and the training artifact extent indication information may be used as the second pseudo label corresponding to the second training sample.

In 1603, the processing device 140 may obtain the target artifact extent determination model by training, based on the sixth training sample images with a second label and the seventh training sample images with the second pseudo label, the candidate artifact extent determination model.

Specifically, the processing device 140 may input the sixth training medical images and the seventh training medical images with the second pseudo label to the candidate artifact extent determination model respectively, calculate the loss values corresponding to the sixth training medical images and the seventh training medical images with the second pseudo label respectively by using the cross entropy loss function. Based on the calculated loss value, the candidate artifact extent determination model may be trained, and finally the target artifact extent determination model may be obtained.

In the embodiment of the present disclosure, the processing device 140 trains the initial artifact extent determination model (e.g., the fifth preliminary model) based on the sixth training medical images to obtain the candidate artifact extent determination model. The seventh training medical images are input to the candidate artifact extent determination model, the intermediate artifact extent indication information output by the candidate artifact extent determination model is obtained, and the intermediate artifact extent indication information is used as the second pseudo label corresponding to the second training sample. The sixth training medical images and the seventh training medical images with the second pseudo label are used to train the candidate artifact extent determination model to obtain the target artifact extent determination model. It may not only ensure the accuracy of the trained target artifact extent determination model, but also reduce the number of labeled samples and reduce the workload of labeled samples. Thus, the inaccurate target artifact extent determination model caused by different sample labeling rules may be avoid.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments of the present disclosure, as shown in FIG. 17, the operation 1603 may be performed based on the following operations.

In 1701, the processing device 140 may obtain a first output artifact extent indication information by inputting the sixth training sample images into the candidate artifact extent determination model, and determining a third loss value based on the first output artifact extent indication information and the second label.

Specifically, the processing device 140 may input the sixth training medical images to the candidate artifact extent determination model and output the first output artifact extent indication information corresponding to the sixth training medical images. The cross entropy loss function may be used to calculate the third loss value between the first output artifact extent indication information output by the candidate artifact extent determination model and the second label corresponding to the sixth training medical images.

The cross entropy loss function may be represented as Equation (4) below:

$$H(p, q) = -\sum_{i=1}^{n} p(x_i)\log(q(x_i)) \quad (4)$$

where $x_i$ is an artifact influence degree category, i=1, 2, 3, 4; p(x) is a true probability distribution; and q(x) is a prediction probability distribution.

In 1702, the processing device 140 may obtain a second output artifact extent indication information by inputting the seventh training sample images into the candidate artifact extent indication model, and determining a fourth loss value based on the second output artifact extent indication information and the second pseudo label.

Specifically, the processing device 140 may input the seventh training medical images to the candidate artifact extent determination model, output the second output artifact extent indication information corresponding to the seventh training medical images, and use the cross entropy loss function to calculate the fourth loss value between the second output artifact extent indication information output by the candidate artifact extent determination model and the second pseudo label corresponding to the seventh training medical images.

The cross entropy loss function may be represented as Equation (4).

In 1703, the processing device 140 may determine a second target loss value based on the third loss value and the fourth loss value, and obtaining the target artifact extent determination model by updating, based on the second target loss value, the candidate artifact extent determination model.

The third weight value and the fourth weight value may be determined based on the number of iterations currently updating the network parameters in the candidate artifact extent determination model.

Specifically, the processing device 140 may identify the number of network iterations based on the candidate artifact degree and determine the third weight value and the fourth weight value corresponding to the third loss value and the fourth loss value respectively. In order to avoid model training failure due to the inaccurate second pseudo label, when the number of iterations is small, the value of the fourth weight may be set smaller, thus the influence of the fourth loss value on the second target loss value may be reduced. For example, assuming the current candidate artifact extent determination model only iterates 10 times, at this time, the third weight value corresponding to the third loss value may be 1, and the fourth weight value corresponding to the fourth loss value may be 0. For another example, as the number of iterations is increasing, the third weight value may become smaller and smaller, and the fourth weight value may become larger and larger until the predetermined number of iterations is reached. Assuming that the predetermined number of iterations is 1000, thus, the proportion of the third loss value and the fourth loss value is the same, that is, the third weight value and the fourth weight value are the same.

The processing device 140 determines the third weight value and the fourth weight value corresponding to the obtained third loss value and the fourth loss value respectively, and performs an operation of weighting and summing on the third loss value and the fourth loss value based on the obtained third weight value and the fourth weight value to obtain the first target loss value.

The processing device 140 updates the network parameters in the candidate artifact extent determination network based on the second target loss value. Until the update reaches a terminal condition, the value of the second target loss value does not change. The processing device 140 determines to train to obtain the target artifact extent determination model.

An exemplary termination condition may be that the value of the loss function in the current iteration is less than a threshold value (e.g., the minimum cost function). Other exemplary termination conditions may include that a maximum number (or count) of iterations has been performed, that the approximation error is less than a certain threshold, a difference between the values of the loss function obtained in a previous iteration and the current iteration (or among the values of the loss function within a certain number or count of successive iterations) is less than a certain threshold, that a difference between the approximation error at the previous iteration and the current iteration (or among the approximation errors within a certain number or count of successive iterations) is less than a certain threshold.

Further, during the training of the above target artifact extent determination model, Adam optimizer may be selected to optimize the target artifact extent determination model, so that the target artifact extent determination model may converge quickly and have good generalization ability.

When the Adam optimizer is used to optimize the target artifact extent determination model, a learning rate may also be set for the optimizer, the learning rate range test (LR range test) may be used to select the best learning rate and the best learning rate may be set to the optimizer. The learning rate selection process of the test technology is: first set the learning rate to a small value, then simply iterate the candidate artifact identification network and the seventh training medical image data for several times, increase the learning rate after each iteration, and record the training loss each time, and then draw the LR range test graph. Generally, an ideal LR range test graph may include three regions: the learning rate of the first region is too small, the loss is basically unchanged; the loss of the second region decreases and converges quickly; and the learning rate of the last region is too large so that the loss begins to diverge. Then, the learning rate corresponding to the lowest point in the LR range test graph may be taken as the best learning rate, and the best learning rate may be set to the optimizer as the initial learning rate of the Adam optimizer.

In the embodiment of the present disclosure, the sixth training medical images are input to the candidate artifact extent determination model, and the third loss value is obtained based on the output of the candidate artifact extent determination model and the second label on the sixth training medical images. The seventh training medical images may be input to the candidate artifact extent determination model, and the fourth loss value may be obtained based on the output of the candidate artifact extent determination model and the second pseudo label on the seventh training medical images. The third weight value and the fourth weight value corresponding to the third loss value and the fourth loss value may be obtained respectively, and the third loss value and the fourth loss value are weighted and summed based on the obtained third weight value and the fourth weight value to obtain the second target loss value, and the network parameters in the candidate artifact degree identification network are updated based on the second target loss value. The third weight value and the fourth weight value are determined based on the number of iterations currently updating the network parameters in the candidate artifact degree identification network. In the above method, the third weight value and the fourth weight value are determined based on the number of iterations to update the network parameters in the candidate artifact extent determination model, which may ensure that the third loss value and the fourth loss value play an appropriate role in the model training process, and may avoid the failure of target artifact extent determination model training due to the inaccurate second pseudo label. Thus, the accuracy of the target artifact extent determination model may be guaranteed.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In order to better explain the method for processing medical image provided by the present disclosure, the present disclosure provides an embodiment for explaining a flow of the method for processing medical image.

The processing device 140 may obtain a candidate artifact identification model by training, based on the third training sample images, a first preliminary model.

The processing device 140 may input the fifth training medical images to the candidate artifact identification network, obtain the intermediate artifact feature information output by the candidate artifact identification network, and take the intermediate artifact feature information as the first pseudo label corresponding to the fifth training medical images.

The processing device 140 may input the seventh training medical images to the candidate artifact identification network, and obtain the first loss value based on the output of the candidate artifact identification network and the first label on the seventh training medical images.

The processing device 140 may input the fifth training medical images to the candidate artifact identification network, and obtain the second loss value based on the output of the candidate artifact identification network and the first pseudo label on the fifth training medical images.

The processing device 140 may obtain the first weight value and the second weight value corresponding to the first loss value and the second loss value respectively, perform an operation of weighting and summing on the first loss value and the second loss value based on the obtained first weight value and the second weight value, obtain the first target loss value, and update the network parameters in the candidate artifact identification network based on the first target loss value.

The processing device 140 may train the initial artifact extent determination model (e.g., the fifth preliminary model) based on the sixth training medical images to obtain the candidate artifact extent determination model.

The processing device 140 may input the seventh training medical images to the candidate artifact extent determination model, obtain the intermediate artifact extent indication information output by the candidate artifact extent determination model, and take the intermediate artifact extent indication information as the second pseudo label corresponding to the seventh training sample images.

The processing device 140 may input the sixth training medical images to the candidate artifact extent determination model, and obtain the third loss value based on the output of the candidate artifact extent determination model and the second label on the sixth training medical images.

The processing device 140 may input the seventh training medical images to the candidate artifact extent determination model, and obtain the fourth loss value based on the output of the candidate artifact extent determination model and the second pseudo label on the seventh training medical images.

The processing device 140 may obtain the third weight value and the fourth weight value corresponding to the third loss value and the fourth loss value respectively, and perform an operation of weighting and summing on the third loss value and the fourth loss value based on the obtained third weight value and the fourth weight value to obtain the second target loss value. The network parameters in the candidate artifact degree identification network are updated based on the second target loss value.

The processing device 140 may read the label information of the medical image to obtain the field strength information of the imaging device 110 corresponding to the medical image.

The processing device 140 may obtain the imaging information identification model corresponding to the field strength information of the imaging device 110.

The processing device 140 may input the medical image to the imaging information identification model to obtain the imaging region and the imaging plane included in the medical image.

The processing device 140 may determine the target artifact identification model based on the field strength information of the imaging device 110, the imaging region and the imaging plane.

The processing device 140 may input the medical image to the target artifact identification model to obtain the target artifact feature information output by the target artifact identification model.

The processing device 140 may determine the target artifact extent determination model based on at least one of the field strength information, target artifact feature information, the imaging region, and the imaging plane.

The processing device 140 may input the medical image and the target artifact feature information to the target artifact extent determination model to obtain the artifact extent indication information output by the target artifact extent determination model.

When the influence degree of the artifact in the medical image on the image quality of the medical image is greater than the predetermined artifact influence degree threshold, the processing device 140 may output the prompt information.

In order to better explain the method for processing medical image provided by the present disclosure, the present disclosure provides an embodiment for explaining the overall flow of another method for processing medical image.

The processing device 140 may obtain a candidate artifact identification model by training, based on the third training sample images, a first preliminary model.

The processing device 140 may input the fifth training medical images to the candidate artifact identification network, obtain the intermediate artifact feature information output by the candidate artifact identification network, and take the intermediate artifact feature information as the first pseudo label corresponding to the fifth training medical images.

The processing device 140 may input the seventh training medical images to the candidate artifact identification network, and obtain the first loss value based on the output of the candidate artifact identification network and the first label on the seventh training medical images.

The processing device 140 may input the fifth training medical images to the candidate artifact identification network, and obtain the second loss value based on the output of the candidate artifact identification network and the first pseudo label on the fifth training medical images.

The processing device 140 may obtain the first weight value and the second weight value corresponding to the first loss value and the second loss value respectively, perform an operation of weighting and summing on the first loss value and the second loss value based on the obtained first weight value and the second weight value, obtain the first target loss value, and update the network parameters in the candidate artifact identification network based on the first target loss value.

The processing device 140 may train the initial artifact extent determination model (e.g., the fifth preliminary model) based on the sixth training medical images to obtain the candidate artifact extent determination model.

The processing device 140 may input the seventh training medical images to the candidate artifact extent determination model, obtain the intermediate artifact extent indication information output by the candidate artifact extent determination model, and take the intermediate artifact extent indication information as the second pseudo label corresponding to the seventh training sample images.

The processing device 140 may input the sixth training medical images to the candidate artifact extent determination model, and obtain the third loss value based on the output of the candidate artifact extent determination model and the second label on the sixth training medical images.

The processing device 140 may input the seventh training medical images to the candidate artifact extent determination model, and obtain the fourth loss value based on the output of the candidate artifact extent determination model and the second pseudo label on the seventh training medical images.

The processing device 140 may obtain the third weight value and the fourth weight value corresponding to the third loss value and the fourth loss value respectively, and perform an operation of weighting and summing on the third loss value and the fourth loss value based on the obtained third weight value and the fourth weight value to obtain the second target loss value. The network parameters in the candidate artifact degree identification network are updated based on the second target loss value.

The processing device 140 may read the label information of the medical image to obtain the field strength information of the imaging device 110 corresponding to the medical image.

The processing device 140 may determine the target artifact identification model based on the field strength information of the imaging device 110.

The processing device 140 may input the medical image to the target artifact identification model to obtain the target artifact feature information output by the target artifact identification model.

The processing device 140 may obtain the imaging information identification model corresponding to the field strength information of the imaging device 110 and the target artifact feature information.

The processing device 140 may input the medical image to the imaging information identification model to obtain the imaging region and the imaging plane included in the medical image.

The processing device 140 may determine the target artifact extent determination model based on at least one of the field strength information, target artifact feature information, the imaging region, and the imaging plane.

The processing device 140 may input the medical image and the target artifact feature information to the target artifact extent determination model to obtain the artifact extent indication information output by the target artifact extent determination model.

When the influence degree of the artifact in the medical image on the image quality of the medical image is greater than the predetermined artifact influence degree threshold, the processing device 140 may output the prompt information.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 14:
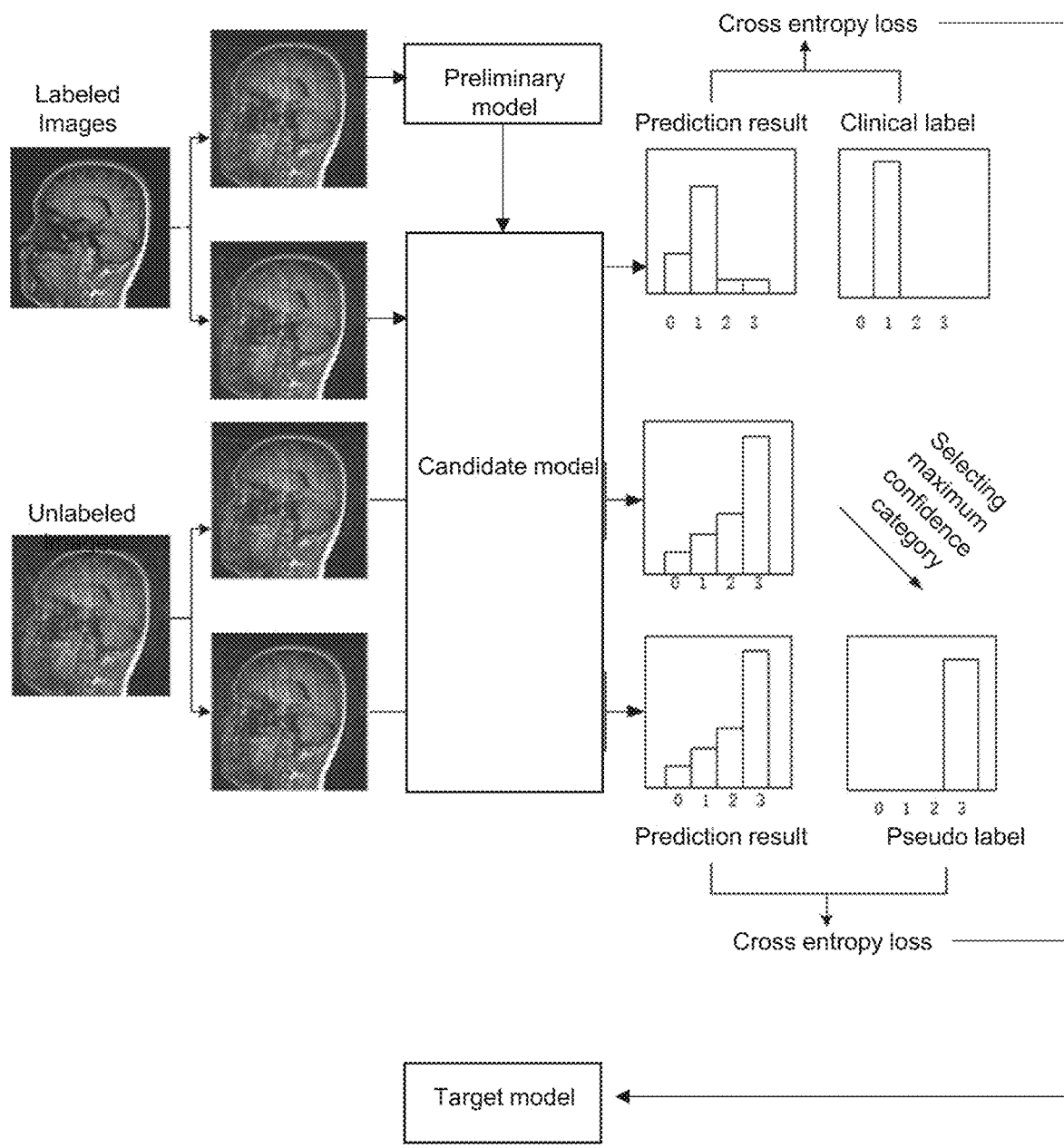
FIG. 14 is a flowchart illustrating an exemplary semi supervised training process according to some embodiments of the present disclosure.

FIG. 14 is a flowchart illustrating an exemplary semi supervised training process according to some embodiments of the present disclosure.

A preliminary model (e.g., the fourth preliminary model or the fifth preliminary model) in FIG. 14 may be trained using labeled training medical images (e.g., the fourth training medical images each of which is with the first label, or the sixth training medical images each of which is with the second label) to obtain a candidate model (e.g., the candidate artifact identification model, or the candidate artifact extent determination model). Then, unlabeled training sample images (e.g., the fifth training medical images or the seventh training medical images) may be input to the candidate model, and the output with the highest confidence may be determined as a pseudo label (e.g., the first pseudo label or the second pseudo) of the unlabeled training sample images. For example, as shown in FIG. 14, numbers 0, 1, 2, 3 in FIG. 14 may represent different outputs, respectively. Then, the labeled images and the unlabeled images with the pseudo label may be input into the candidate model. The candidate model may output a first prediction result (e.g., the first output artifact feature information, or the first output artifact extent indication information) corresponding to the labeled images, and a second prediction result (e.g., the second output artifact feature information, or the second output artifact extent indication information) corresponding to the unlabeled images. A first loss value may be determined based on a difference between the first prediction result and the label (e.g., the first label or the second label) of the labeled images. A second loss value may be determined based on a difference between the second prediction result and the pseudo label of the labeled images. A target model (e.g., the target artifact identification model or the target artifact extent determination model) may be obtained by updating the candidate model based on the first loss value and the second loss value.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for image processing, comprising:
   at least one storage device including a set of instructions; and
   at least one processor configured to communicate with the at least one storage device, wherein when executing the set of instructions, the at least one processor is configured to direct the system to perform operations including:
      obtaining an image of an object;
      obtaining a target artifact identification model;
      determining target artifact feature information by inputting the image into the target artifact identification model, the target artifact feature information indicating a feature of one or more artifacts in the image;
      obtaining a target artifact extent determination model;
      determining target artifact extent indication information by inputting the image and the target artifact feature information into the target artifact extent determination model, the target artifact extent indication information indicating an influence extent of the one or more artifacts on an image quality of the image;
      determining, based on the target artifact extent indication information, whether the influence extent is greater than or equal to an extent threshold; and
      in response to determining that the influence extent is greater than or equal to the extent threshold, outputting a notice of the one or more artifacts of the image,
      wherein the target artifact extent determination model is obtained by:
         obtaining a second training sample set including a plurality of second training samples, each of the plurality of second training samples including a second training sample image and training artifact extent indication information corresponding to the second training sample image; and
         obtaining the target artifact extent determination model by training, based on the second training sample set, a second preliminary model.

2. The system of claim 1, wherein the at least one processor is configured to direct the system to perform the operations further including:
   identifying, in the image, an anatomical portion of the object and an imaging plane of the object.

3. The system of claim 2, wherein identifying the anatomical portion of the object and the imaging plane of the object before determining the target artifact feature information includes:
   obtaining magnetic field intensity information of an imaging device, the imaging device being configured to scan the object to generate the image;
   obtaining an imaging information identification model corresponding to the magnetic field intensity information; and
   identifying the anatomical portion and the imaging plane of the object by inputting the image into the imaging information identification model.

4. The system of claim 3, wherein the target artifact identification model is obtained based on the magnetic field intensity information of the imaging device corresponding to the image, the anatomical portion, and the imaging plane.

5. The system of claim 2, wherein identifying the anatomical portion of the object and the imaging plane of the object after determining the target artifact feature information includes:
   obtaining magnetic field intensity information of an imaging device, the imaging device being configured to scan the object to generate the image;
   obtaining an imaging information identification model corresponding to the magnetic field intensity information and the target artifact feature information; and
   identifying the anatomical portion and the imaging plane of the object by inputting the image into the imaging information identification model.

6. The system of claim 5, wherein the target artifact identification model is obtained based on the magnetic field intensity information of the imaging device corresponding to the image.

7. The system of claim 2, wherein the target artifact extent determination model is obtained based on at least one of magnetic field intensity information of an imaging device corresponding to the image, the target artifact feature information, the anatomical portion, or the imaging plane.

8. The system of claim 1, wherein the target artifact identification model is obtained by:
   obtaining a first training sample set including a plurality of first training samples, each of the plurality of first training samples including a first training sample image and training artifact feature information corresponding to the first training sample image; and
   obtaining the target artifact identification model by training, based on the first training sample set, a first preliminary model.

9. The system of claim 8, wherein obtaining the target artifact identification model by training, based on the first training sample set, the first preliminary model includes:
   performing, based on a standard score, normalization on a brightness of each first training sample image in the first training sample set; and
   obtaining the target artifact identification model by training, based on the normalized first training sample set, the first preliminary model.

10. The system of claim 1, wherein the target artifact identification model is obtained based on a third training sample set, the third training sample set including third training sample images each of which is with a first label and fourth training sample images without the first label, the first label including training artifact feature information.

11. The system of claim 10, wherein the target artifact identification model is obtained by:
- obtaining a candidate artifact identification model by training, based on the third training sample images, a first preliminary model;
- obtaining an intermediate artifact feature information by inputting the fourth training sample images into the candidate artifact identification model;
- designating the intermediate artifact feature information as a first pseudo label of the fourth training sample images;
- obtaining the target artifact identification model by training, based on the third training sample images with the first label and the fourth training sample images with the first pseudo label, the candidate artifact identification model.

12. The system of claim 11, wherein obtaining the target artifact identification model by training, based on the third training sample images with the first label and the fourth training sample images with the first pseudo label, the candidate artifact identification model includes:
- obtaining a first output artifact feature information by inputting the third training sample images into the candidate artifact identification model;
- determining a first loss value based on the first output artifact feature information and the first label;
- obtaining a second output artifact feature information by inputting the fourth training sample images into the candidate artifact identification model;
- determining a second loss value based on the second output artifact feature information and the first pseudo label;
- determining a first target loss value based on the first loss value and the second loss value; and
- obtaining the target artifact identification model by updating, based on the first target loss value, the candidate artifact identification model.

13. The system of claim 12, wherein determining the first target loss value based on the first loss value and the second loss value includes:
- obtaining a first weight corresponding to the first loss value and a second weight corresponding to the second loss value; and
- determining the first target loss value by determining, based on the first weight and the second weight, a weighted sum of the first loss value and the second loss value.

14. The system of claim 1, wherein the target artifact extent determination model is obtained based on a fourth training sample set, the fourth training sample set including a plurality of fifth training sample images each of which is with a second label, and a plurality of sixth training sample images without the second label, the second label including training artifact extent indication information.

15. The system of claim 14, wherein the target artifact extent determination model is obtained by:
- obtaining a candidate artifact extent determination model by training, based on the fifth training sample images, a second preliminary model;
- obtaining an intermediate artifact extent indication information by inputting the sixth training sample images into the candidate artifact extent determination model;
- designating the intermediate artifact extent indication information as a second pseudo label of the sixth training sample images;
- obtaining the target artifact extent determination model by training, based on the fifth training sample images with the second label and the sixth training sample images with the second pseudo label, the candidate artifact extent determination model.

16. The system of claim 15, wherein obtaining the target artifact extent determination model by training, based on the fifth training sample images with the second label and the sixth training sample images with the second pseudo label, the candidate artifact extent determination model includes:
- obtaining a first output artifact extent indication information by inputting the fifth training sample images into the candidate artifact extent determination model;
- determining a third loss value based on the first output artifact extent indication information and the second label;
- obtaining a second output artifact extent indication information by inputting the sixth training sample images into the candidate artifact extent indication model;
- determining a fourth loss value based on the second output artifact extent indication information and the second pseudo label;
- determining a second target loss value based on the third loss value and the fourth loss value; and
- obtaining the target artifact extent determination model by updating, based on the second target loss value, the candidate artifact extent determination model.

17. The system of claim 16, wherein determining the second target loss value based on the third loss value and the fourth loss value includes:
- obtaining a third weight corresponding to the third loss value and a fourth weight corresponding to the fourth loss value; and
- determining the second target loss value by determining, based on the third weight and the fourth weight, a weighted sum of the third loss value and the fourth loss value.

18. A method for image processing implemented on a machine including one or more processors and one or more storage devices, comprising:
- obtaining an image of an object;
- obtaining a target artifact identification model;
- determining target artifact feature information by inputting the image into the target artifact identification model, the target artifact feature information indicating a feature of one or more artifacts in the image;
- obtaining a target artifact extent determination model;
- determining target artifact extent indication information by inputting the image and the target artifact feature information into the target artifact extent determination model, the target artifact extent indication information indicating an influence extent of the one or more artifacts on an image quality of the image;
- determining, based on the target artifact extent indication information, whether the influence extent is greater than or equal to an extent threshold; and
- in response to determining that the influence extent is greater than or equal to the extent threshold, outputting a notice of the one or more artifacts of the image,
- wherein the target artifact identification model is obtained based on a third training sample set, the third training sample set including third training sample images each of which is with a first label and fourth training sample images without the first label, the first label including training artifact feature information.

19. A non-transitory computer readable medium, comprising at least one set of instructions, wherein when executed by one or more processors of a computing device, the at least one set of instructions causes the computing device to perform a method, the method comprising:
  obtaining an image of an object;
  obtaining a target artifact identification model;
  determining target artifact feature information by inputting the image into the target artifact identification model, the target artifact feature information indicating a feature of one or more artifacts in the image;
  obtaining a target artifact extent determination model;
  determining target artifact extent indication information by inputting the image and the target artifact feature information into the target artifact extent determination model, the target artifact extent indication information indicating an influence extent of the one or more artifacts on an image quality of the image;
  determining, based on the target artifact extent indication information, whether the influence extent is greater than or equal to an extent threshold; and
  in response to determining that the influence extent is greater than or equal to the extent threshold, outputting a notice of the one or more artifacts of the image,
  wherein the target artifact extent determination model is obtained based on a fourth training sample set, the fourth training sample set including a plurality of fifth training sample images each of which is with a second label, and a plurality of sixth training sample images without the second label, the second label including training artifact extent indication information.

* * * * *